(12) United States Patent
Nie et al.

(10) Patent No.: US 12,087,289 B2
(45) Date of Patent: Sep. 10, 2024

(54) SPEECH RECOGNITION METHOD, APPARATUS, AND DEVICE, AND COMPUTER-READABLE STORAGE MEDIUM

(71) Applicant: HUAWEI TECHNOLOGIES CO.,LTD., Guangdong (CN)

(72) Inventors: Weiran Nie, Shanghai (CN); Fuliang Weng, Shenzhen (CN); Youjia Huang, Shenzhen (CN); Hai Yu, Shanghai (CN); Shumang Hu, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 269 days.

(21) Appl. No.: 17/539,005

(22) Filed: Nov. 30, 2021

(65) Prior Publication Data

US 2022/0093087 A1    Mar. 24, 2022

Related U.S. Application Data

(63) Continuation of application No. PCT/CN2020/079522, filed on Mar. 16, 2020.

(30) Foreign Application Priority Data

May 31, 2019  (CN) .......................... 201910470966.4

(51) Int. Cl.
*G10L 15/18* (2013.01)
*G10L 15/187* (2013.01)
(Continued)

(52) U.S. Cl.
CPC .......... *G10L 15/1822* (2013.01); *G10L 15/18* (2013.01); *G10L 15/187* (2013.01);
(Continued)

(58) Field of Classification Search
None
See application file for complete search history.

(56) References Cited

U.S. PATENT DOCUMENTS

| 5,384,892 A | 1/1995 | Strong |
|---|---|---|
| 7,716,056 B2 | 5/2010 | Weng et al. |

(Continued)

FOREIGN PATENT DOCUMENTS

| CN | 101656799 A | 2/2010 |
|---|---|---|
| CN | 105529030 A | 4/2016 |

(Continued)

OTHER PUBLICATIONS

English translation of CN-105632495-B (Year: 2019).*
(Continued)

*Primary Examiner* — Richard Z Zhu
(74) *Attorney, Agent, or Firm* — Gregg Jansen

(57) ABSTRACT

A speech recognition method, apparatus, and device, and a computer-readable storage medium provided pertain to the field of artificial intelligence technologies. The method includes: obtaining or generating a dynamic target language model based on reply information of a first intent, where the dynamic target language model includes a front-end part and a core part; obtaining a speech signal, parsing the speech signal to generate a key word; and invoking the dynamic target language model to determine a second intent and a service content. The front-end part of the dynamic target language model parses out the second intent based on the key word, and the core part of the dynamic target language model parses out the service content based on the key word. The speech recognition method prevents a provided service content from deviating from a user requirement and achieves a good recognition effect.

20 Claims, 7 Drawing Sheets

(51) Int. Cl.

| | |
|---|---|
| *G10L 15/22* | (2006.01) |
| *G10L 15/06* | (2013.01) |
| *G10L 15/065* | (2013.01) |
| *G10L 15/07* | (2013.01) |
| *G10L 15/08* | (2006.01) |

(52) U.S. Cl.
CPC ............ *G10L 15/22* (2013.01); *G10L 15/063* (2013.01); *G10L 15/065* (2013.01); *G10L 15/07* (2013.01); *G10L 2015/088* (2013.01)

(56) References Cited

U.S. PATENT DOCUMENTS

| | | | |
|---|---|---|---|
| 7,949,532 B2* | 5/2011 | Huang | G06F 40/268 |
| | | | 704/270.1 |
| 8,239,129 B2 | 8/2012 | Shen et al. | |
| 8,935,163 B2* | 1/2015 | Huang | G10L 15/22 |
| | | | 704/235 |
| 8,990,085 B2 | 3/2015 | Ljolje et al. | |
| 9,082,403 B2* | 7/2015 | Ju | G10L 15/1822 |
| 9,922,642 B2* | 3/2018 | Pitschel | G10L 15/063 |
| 10,832,664 B2* | 11/2020 | Biadsy | G10L 15/197 |
| 2004/0148170 A1 | 7/2004 | Acero et al. | |
| 2005/0080632 A1* | 4/2005 | Endo | G10L 15/08 |
| | | | 704/277 |
| 2012/0316877 A1* | 12/2012 | Zweig | G10L 15/197 |
| | | | 704/E15.001 |
| 2013/0159000 A1 | 6/2013 | Ju et al. | |
| 2015/0279360 A1 | 10/2015 | Mengibar et al. | |
| 2016/0196820 A1* | 7/2016 | Williams | G10L 15/1822 |
| | | | 704/244 |
| 2019/0013017 A1* | 1/2019 | Kang | G10L 25/51 |
| 2019/0079724 A1* | 3/2019 | Feuz | G06F 3/167 |
| 2020/0175973 A1* | 6/2020 | Bender | G06N 5/01 |
| 2020/0349919 A1* | 11/2020 | Wanas | G10L 15/1815 |

FOREIGN PATENT DOCUMENTS

| | | | |
|---|---|---|---|
| CN | 105590626 A | | 5/2016 |
| CN | 105632495 A | | 6/2016 |
| CN | 106486120 A | | 3/2017 |
| CN | 109003611 A | | 12/2018 |
| CN | 109616108 A | | 4/2019 |
| CN | 105632495 B | * | 7/2019 |
| JP | 2004523004 A | | 7/2004 |
| JP | 2006023345 A | | 1/2006 |
| JP | 2008506156 A | | 2/2008 |
| JP | 2015081971 A | | 4/2015 |

OTHER PUBLICATIONS

European Patent Office Search Opinion. (Year: 2022).*
Japanese Patent Office Search Opinion. (Year: 2022).*
Chinese Patent Office PCT search opinion. (Year: 2020).*
Frank Wessel et al.,"A Comparison of Dialogue-State Dependent Languagemodels",Researchgate, Jun. 1999,total 5 pages.
Grace Chung et al.,"A Dynamic Vocabulary Spoken Dialogue Interface",Interspeech 2004,Oct. 2004,total 4 pages.
Roger Argiles Solsona et al.,"Adaptive Language Models for Spoken Dialogue SYSTEMS",2002 IEEE, total 4 pages.
Alexander Gruenstein et al., "Context-Sensitive Statistical Language Modeling",Interspeech 2005,Sep 4-8,total 4 pages.
Dani Yogatama et al.,"Dynamic Language Models for Streaming Text",Transactions of the Association for Computational Linguistics, vol. 2,2014,total 12 pages.
Karthik Visweswariah et al.,"Language Models Conditioned on Dialog State",Eurospeech 2001—Scandinavia,total 4 pages.
X. Chen et al.,"Recurrent Neural Network Language Models for Keyword Search",ICASSP2017 IEEE,total 5 pages.
Guoguo Chen et al.,"Small-Footprint Keyword Spotting Using Deep Neural NETWORKS",2014 IEEE International Conference on Acoustic, Speech and Signal Processing (ICASSP),total 5 pages.
Yaodong Zhang et al.,"Unsupervised Spoken Keyword Spotting via Segmental DTW on Gaussian Posteriorgrams",2009 IEEE,total 6 pages.

* cited by examiner

SPEECH RECOGNITION METHOD, APPARATUS, AND DEVICE, AND COMPUTER-READABLE STORAGE MEDIUM

CROSS-REFERENCE TO RELATED APPLICATIONS

This application is a continuation of International Application No. PCT/CN2020/079522, filed on Mar. 16, 2020, which claims priority to Chinese Patent Application No. 201910470966.4, filed on May 31, 2019. The disclosures of the aforementioned applications are hereby incorporated by reference in their entireties.

TECHNICAL FIELD

This application relates to the field of artificial intelligence technologies, and in particular, to a speech recognition method, apparatus, and device, and a computer-readable storage medium.

BACKGROUND

With development of artificial intelligence technologies, artificial intelligence systems are widely used in spheres of life. A speech recognition system is one of the artificial intelligence systems. During use of the speech recognition system, a user sends a speech instruction to the speech recognition system, and the speech recognition system needs to perform speech recognition on the speech instruction, understand a user instruction, and ask the user a question according to the user instruction. Then, the speech recognition system recognizes a reply speech sent by the user in response to the question, understands a user reply, and provides a service indicated by the user reply, to meet a user requirement. Therefore, how to perform speech recognition is a key to meeting the user requirement.

A related technology provides a speech recognition method. In the method, after a language model is invoked to recognize a speech instruction and understand a user instruction, a question is sent to a user, and the language model is further adjusted based on the question, for example, a vocabulary set related to the question is integrated into the language model, so that a language model obtained after adjustment can recognize vocabularies in the vocabulary set. When the user sends a reply speech by using the vocabularies in the vocabulary set, the language model obtained after adjustment can recognize the reply speech, to meet a user requirement.

The inventors find that the related technology has at least the following problems:

In addition to the speech instruction and the reply speech, the user may make an irrelevant speech for communication with a third party. For example, in a typical multi-user scenario or multi-situation scenario, when the user performs speech interaction with an in-vehicle module in an automobile or an electric vehicle, the irrelevant speech may probably include a dialogue between the user and another user, a speech interposed by another user, or the like. A speech recognition system of the in-vehicle module also recognizes and understands the irrelevant speech as the speech instruction or the reply speech. Consequently, a provided service deviates from the user requirement, and user experience is poor.

SUMMARY

Embodiments of this application provide a speech recognition method, apparatus, and device and a computer-readable storage medium, to overcome problems of poor recognition effect and poor user experience in related technologies.

According to an aspect, this application provides a speech recognition method, including:

According to an aspect, a speech recognition method is provided. The method includes: obtaining or generating a dynamic target language model based on reply information of a first intent, where the dynamic target language model includes a front-end part and a core part, the core part is configured to determine a possible description related to the reply information, and the front-end part is configured to determine a description of confirmatory information of the reply information, after a speech signal is obtained, and the speech signal is parsed to generate a key word, the dynamic target language model may be invoked to determine a second intent and service content, where the front-end part of the dynamic target language model parses out the second intent based on the key word, and the core part of the dynamic target language model parses out the service content based on the key word.

A speech recognition scenario in which a dialogue between a user and an in-vehicle module is performed is used as an example. The first intent includes an intent that is obtained by parsing a speech signal of the user after a spoken dialogue between the user and the in-vehicle module starts. The reply information of the first intent includes one or more pieces of reply information returned to the user by the in-vehicle module based on the first intent, and the in-vehicle module obtains, based on the reply information of the first intent, the dynamic target language model including the front-end part and the core part. After the in-vehicle module returns the one or more pieces of reply information to the user, the in-vehicle module obtains a speech signal again. It should be noted that the speech signal obtained by the in-vehicle module again may include a speech signal, namely, a speech signal related to the reply information, of the dialogue between the user and the in-vehicle module, and an irrelevant speech signal of a dialogue between the user and another user.

Then, the in-vehicle module parses the obtained speech signal to generate a key word, invokes the dynamic target language model, and parses out vocabularies related to the reply information from the generated key word. The dynamic target language model includes the front-end part and the core part. The front-end part is configured to determine a description of confirmatory information of the reply information by the user, and the confirmatory information may include confirmation information, correction information, cancellation information, and the like. The second intent of the user may be obtained by parsing the key word by using the front-end part. For example, if there is one piece of the reply information of the first intent, and confirmatory information obtained by the front-end part by parsing the key word includes confirmation information "Yes, that's right", it may be determined that the second intent of the user is an intent indicated by the reply information of the first intent.

The core part is configured to determine the possible description related to the reply information, and the core part may parse out, from the key word, a vocabulary used by the user to describe the reply information, to obtain the service content based on the vocabulary, and then provide the user with a service indicated by the service content. In this embodiment, a third-party cloud service may provide the service indicated by the service content, or the in-vehicle module may provide the service indicated by the service content, or a vehicle-mounted terminal may provide the service indicated by the service content, or an automotive enterprise may provide the service indicated by the service content. The vehicle-mounted terminal may be another terminal other than the in-vehicle module on a vehicle, for example, a vehicle-mounted display, a vehicle-mounted air conditioner, or a vehicle-mounted speaker. Certainly, two or more of the third-party cloud service, the in-vehicle module, the vehicle-mounted terminal, and the automotive enterprise may jointly provide the service indicated by the service content. It should be noted that because both the front-end part and the core part of the dynamic target language model are obtained based on the reply information, both the second intent obtained by using the front-end part and the service content obtained by using the core part are related to the first intent, and speech signals irrelevant to the first intent are ignored. Therefore, in this embodiment of this application, an effect of performing speech recognition is relatively good, so that a provided service deviates from a user requirement due to interference of irrelevant speech signals is avoided, and user experience is improved.

Optionally, the dynamic target language model further includes a rear-end part, and the rear-end part is configured to determine whether an additional intent exists. The method further includes: invoking the dynamic target language model to determine an additional intent, and parsing out, by using the rear-end part of the dynamic target language model, the additional intent based on the key word.

Optionally, the rear-end part includes a rear-end indicator word. The invoking the dynamic target language model to determine an additional intent, and parsing out, by using the rear-end part of the dynamic target language model, the additional intent based on the key word includes: parsing out, based on the key word by using the rear-end part, a reference rear-end indicator word and a time point at which the reference rear-end indicator word is located; updating the dynamic target language model based on the reference rear-end indicator word with reference to the first intent and the second intent, to obtain an updated target language model; and invoking the updated target language model, to parse out the additional intent based on the key word and the time point at which the reference rear-end indicator word is located. By parsing out the additional intent, a more accurate service can be further provided.

Optionally, before the obtaining a speech signal, the method further includes: buffering a historical speech signal; and the parsing the speech signal to generate a key word includes: parsing the speech signal, and performing context detection by using the historical speech signal to generate the key word. Context detection is performed by using historical speech signal, so that a recognized key word is more suitable for the current scenario, to further improve accuracy of speech recognition.

Optionally, after the invoking the dynamic target language model to determine a second intent and service content, the method further includes: confirming the second intent, to obtain a confirmed second intent.

Optionally, the confirming the second intent, to obtain a confirmed second intent includes: sending confirmation information of the second intent to the user, obtaining a second intent fed back by the user, and using the second intent fed back by the user as the confirmed second intent. The second intent is confirmed, so that the second intent is more accurate, and more accurate service content is provided.

Optionally, the obtaining a dynamic target language model based on reply information of a first intent includes: converting the reply information of the first intent into a reference format to obtain reply information in the reference format, and obtaining or generating the dynamic target language model based on the reply information in the reference format. Because different providers may provide reply information in different formats, the reply information is converted into the reference format to unify formats of the reply information, and facilitate receiving of the reply information. In different application fields, the reply information is converted into different reference formats, so that reply information formats in a same application field are the same.

Optionally, the obtaining or generating the dynamic target language model based on the reply information in the reference format includes: converting a trained language model into a weighted finite state transducer, and using the weighted finite state transducer as the dynamic target language model, where the trained language model is obtained by training the reply information in the reference format and a reference vocabulary. The reference vocabulary includes but is not limited to a class name corresponding to a vocabulary in the reply information in the reference format, and a representative expression word.

Optionally, the obtaining or generating the dynamic target language model based on the reply information in the reference format includes: converting a trained language model into a weighted finite state transducer, and using the weighted finite state transducer as a first language model, where the trained language model is obtained by training reply information that is in the reference format and the length of the reply information is not less than a reference length; obtaining a second language model based on reply information that is in the reference format and the length of the reply information is less than the reference length, and obtaining a third language model based on a reference vocabulary; and combining the first language model, the second language model, and the third language model to obtain a total language model, and using the total language model as the dynamic target language model.

Optionally, the obtaining or generating the dynamic target language model based on the reply information in the reference format includes: obtaining a word confusion network based on reply information that is in the reference format and the length of the reply information is not less than a reference length, where each vocabulary in the word confusion network has a transition probability; calculating a penalty weight of each vocabulary, converting the word confusion network into a weighted finite state transducer based on the penalty weight of each vocabulary, and using the weighted finite state transducer as a first language model; obtaining a second language model based on reply information that is in the reference format and the length of the reply information is less than the reference length, and obtaining a third language model based on a reference vocabulary; and combining the first language model, the second language model, and the third language model to obtain a total language model, and using the total language model as the dynamic target language model.

Optionally, the calculating a penalty weight of each vocabulary includes: using, for any vocabulary, a negative logarithm value of a transition probability of the vocabulary as the penalty weight. The transition probability of a vocabulary is used to indicate a frequency of occurrence of the vocabulary in a category in which the vocabulary is located, and a higher frequency of occurrence of the vocabulary in the category in which the vocabulary is located indicates a larger transition probability, and a smaller negative logarithm value of the transition probability, that is, the penalty weight is inversely proportional to the frequency of occurrence. In this way, a target language model can better parse out a vocabulary that has a higher frequency of occurrence in the category in which the vocabulary is located.

Optionally, the calculating a penalty weight of each vocabulary includes: using, for any vocabulary, a logarithm value of a quantity of pieces of reply information that is in the reference format and that includes the vocabulary as the penalty weight. A smaller penalty weight is given to vocabularies with strong distinctiveness, namely, vocabularies included in a relatively small quantity of pieces of reply information in the reference format, so that the target language model can better parse out these vocabularies with strong distinctiveness.

Optionally, the calculating a penalty weight of each vocabulary includes: using, for any vocabulary, a logarithm value of a quantity of times of occurrence of the vocabulary in the reply information in the reference format as the penalty weight. The vocabularies with strong distinctiveness, namely, vocabularies with a smaller quantity of times of occurrence, have smaller penalty probabilities, so that the dynamic target language model can better parse out the vocabularies with strong distinctiveness.

According to an aspect, a speech recognition apparatus is provided. The apparatus includes: a first obtaining module, configured to obtain or generate a dynamic target language model based on reply information of a first intent, where the dynamic target language model includes a front-end part and a core part, the core part is configured to determine a possible description related to the reply information, and the front-end part is configured to determine a description of confirmatory information of the reply information; a second obtaining module, configured to obtain a speech signal, and parse the speech signal to generate a key word; and a first determining module, configured to invoke the dynamic target language model to determine a second intent and service content, where the front-end part of the dynamic target language model parses out the second intent based on the key word, and the core part of the dynamic target language model parses out the service content based on the key word.

Optionally, the dynamic target language model further includes a rear-end part, and the rear-end part is configured to determine whether an additional intent exists. The apparatus further includes: a second determining module, configured to invoke the dynamic target language model to determine an additional intent, and parse out, by using the rear-end part of the dynamic target language model, the additional intent based on the key word.

Optionally, the rear-end part includes a rear-end indicator word; and the second determining module is configured to: parse out, based on the key word by using the rear-end part, a reference rear-end indicator word and a time point at which the reference rear-end indicator word is located; update the dynamic target language model based on the reference rear-end indicator word with reference to the first intent and the second intent, to obtain an updated target language model; and invoke the updated target language model, to parse out the additional intent based on the key word and the time point at which the reference rear-end indicator word is located.

Optionally, the apparatus further includes: a buffer module, configured to buffer a historical speech signal; and the second obtaining module is configured to parse the speech signal, and perform context detection by using the historical speech signal to generate the key word.

Optionally, the apparatus further includes: a confirmation module, configured to confirm the second intent, to obtain a confirmed second intent.

Optionally, the confirmation module is configured to send confirmation information of the second intent to a user, obtain a second intent fed back by the user, and use the second intent fed back by the user as the confirmed second intent.

Optionally, the first obtaining module is configured to convert the reply information of the first intent into a reference format to obtain reply information in the reference format, and obtain or generate the dynamic target language model based on the reply information in the reference format.

Optionally, the first obtaining module is configured to convert a trained language model into a weighted finite state transducer, and use the weighted finite state transducer as the dynamic target language model, where the trained language model is obtained by training the reply information in the reference format and a reference vocabulary.

Optionally, the first obtaining module is configured to: convert a trained language model into a weighted finite state transducer, and use the weighted finite state transducer as a first language model, where the trained language model is obtained by training reply information that is in the reference format and the length of the reply information is not less than a reference length; obtain a second language model based on reply information that is in the reference format and the length of the reply information is less than the reference length, and obtain a third language model based on a reference vocabulary; and combine the first language model, the second language model, and the third language model to obtain a total language model, and use the total language model as the dynamic target language model.

Optionally, the first obtaining module includes: a first obtaining unit, configured to obtain a word confusion network based on reply information that is in the reference format and the length of the reply information is not less than a reference length, where each vocabulary in the word confusion network has a transition probability; a calculation unit, configured to calculate a penalty weight of each vocabulary, convert the word confusion network into a weighted finite state transducer based on the penalty weight of each vocabulary, and use the weighted finite state transducer as a first language model; a second obtaining unit, configured to obtain a second language model based on reply information that is in the reference format and the length of the reply information is less than the reference length, and obtain a third language model based on a reference vocabulary; and a combining unit, configured to combine the first language model, the second language model, and the third language model to obtain a total language model, and use the total language model as the dynamic target language model.

Optionally, the calculation unit is configured to use, for any vocabulary, a negative logarithm value of a transition probability of the vocabulary as the penalty weight.

Optionally, the calculation unit is configured to use, for any vocabulary, a logarithm value of a quantity of pieces of reply information that is in the reference format and that includes the vocabulary as the penalty weight.

Optionally, the calculation unit is configured to use, for any vocabulary, a logarithm value of a quantity of times of occurrence of the vocabulary in the reply information in the reference format as the penalty weight.

According to an aspect, a speech recognition device is provided. The device includes a memory and a processor.

The memory stores at least one instruction, and the at least one instruction is loaded and executed by the processor, to implement the method in the first aspect or in any implementation of the first aspect in the embodiments of this application.

Optionally, there are one or more processors, and there are one or more memories.

Optionally, the memory may be integrated with the processor, or the memory and the processor are separately disposed.

In an implementation, the memory may be a non-transitory memory, for example, a read-only memory (ROM). The memory and the processor may be integrated into one chip, or may be disposed in different chips. A type of the memory and a manner in which the memory and the processor are disposed are not limited in this embodiment of this application.

According to another aspect, a computer-readable storage medium is provided. The computer-readable storage medium stores a program or an instruction, and the instruction is loaded and executed by a processor to implement any one of the foregoing speech recognition methods.

A computer program (product) is further provided. The computer program (product) includes computer program code. When the computer program code is run on a computer, the computer is enabled to perform any one of the foregoing speech recognition methods.

A chip is further provided. The chip includes a processor. The processor is configured to invoke and run instructions stored in a memory, to cause a communications device on which the chip is installed to perform any one of the foregoing speech recognition methods.

Another chip is further provided. The chip includes an input interface, an output interface, a processor, and a memory. The input interface, the output interface, the processor, and the memory are connected through an internal connection path. The processor is configured to execute code in the memory. When the code is executed, the processor is configured to perform any one of the foregoing speech recognition methods.

The technical solutions provided in the embodiments of this application bring at least the following beneficial effects:

In the embodiments of this application, the dynamic target language model that includes the front-end part and the core part is obtained or generated based on the reply information of the first intent, and after the speech signal is parsed to obtain the key word, the dynamic target language model is invoked to parse the key word to obtain the second intent and the service content. Because the dynamic target language model is obtained based on the reply information of the first intent, both the second intent and the service content that are obtained through parsing by using the dynamic target language model are related to the first intent. Therefore, in the embodiments of this application, speeches irrelevant to the first intent are ignored, in other words, discontinuous speeches with a plurality of intents can be recognized, so that provided service content does not deviate from a user requirement, a recognition effect is good, and user experience is improved.

The technical solutions provided in this application include at least the following beneficial effects:

In the embodiments of this application, the dynamic target language model that includes the front-end part and the core part is obtained or generated based on the reply information of the first intent, and after the speech signal is parsed to obtain the key word, the dynamic target language model is invoked to parse the key word to obtain the second intent and the service content. Because the dynamic target language model is obtained based on the reply information of the first intent, both the second intent and the service content that are obtained through parsing by using the dynamic target language model are related to the first intent. Therefore, in the embodiments of this application, speeches irrelevant to the first intent are ignored, in other words, discontinuous speeches with a plurality of intents can be recognized, so that provided service content does not deviate from a user requirement, a recognition effect is good, and user experience is improved.

DESCRIPTION OF EMBODIMENTS

Figure 1:
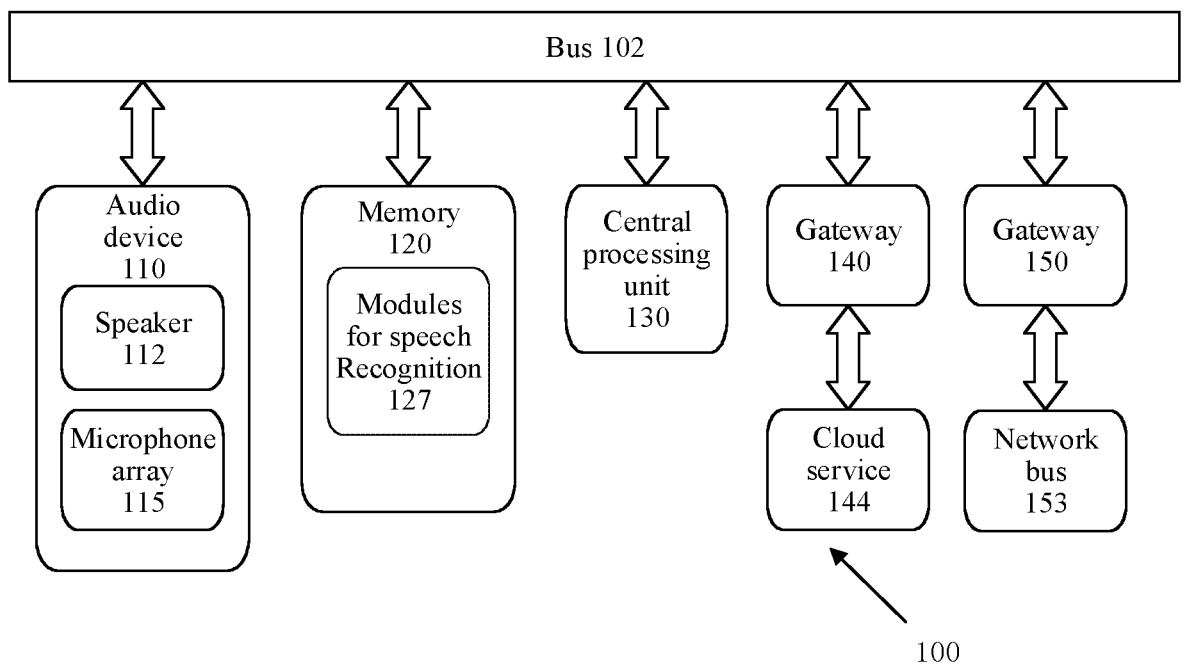
FIG. 1 is a diagram of an implementation environment according to an embodiment of this application.

To make objectives, technical solutions, and advantages of this application clearer, the following further describes implementations of this application in detail with reference to the accompanying drawings.

With development of artificial intelligence technologies, artificial intelligence systems are widely used in life fields. A speech recognition system is one of the artificial intelligence systems. When the speech recognition system is used, a user sends a speech instruction to the speech recognition system, and the speech recognition system needs to perform speech recognition on the speech instruction, understand a user instruction, and ask the user a question according to the user instruction. Then, the speech recognition system recognizes a reply speech sent by the user in response to the question, understands a user reply, and provides a service indicated by the user reply, to meet a user requirement. Therefore, how to perform speech recognition is a key to meeting the user requirement.

A related technology provides a speech recognition method. In the method, after a language model is invoked to recognize a speech instruction and understand a user instruction, a question is sent to a user, and the language model is further adjusted based on the question, for example, a vocabulary set related to the question is integrated into the language model, so that a language model obtained after adjustment can recognize vocabularies in the vocabulary set. When the user sends a reply speech by using the vocabularies in the vocabulary set, the language model obtained after adjustment can recognize the reply speech, to meet a user requirement.

However, a speech sent by the user is usually flexible. For example, in a multi-user in-vehicle navigation scenario, the following spoken dialogue may occur between the user and an in-vehicle module:

User: (To the in-vehicle module) Help me find a nearby Sichuan restaurant.

In-vehicle module: (To the user) Do you want to go to Sichuan restaurant A?

User: (To another user in a vehicle) It is noon. Is there any problem with parking? (To the in-vehicle module) Yes, that is Sichuan restaurant A.

This dialogue is performed by using the method provided in the related technology. In this case, after a speech recognition system of the in-vehicle module asks the question according to the speech instruction, the vocabulary "Sichuan restaurant A" in the question may be integrated into the language model, to obtain the language model obtained after adjustment. Then, if the user sends the reply speech "Yes, that is Sichuan restaurant A" by using "Sichuan restaurant A", the language model obtained after adjustment may recognize the reply speech. However, in the foregoing dialogue, the user first sends an irrelevant speech for communication with the another user in the vehicle. Therefore, the language model obtained after adjustment also recognizes the irrelevant speech as a reply speech, which leads to an understanding error. It can be learned that the speech recognition method provided in the related technology is poor in recognition effect and user experience.

An embodiment of this application provides a speech recognition method, and the method may be used in an implementation environment shown in FIG. 1. FIG. 1 is a diagram of an implementation environment 100 according to an embodiment of this application. FIG. 1 includes an audio device 110, a memory 120, and a central processing unit (CPU) 130. The audio device 110 includes a microphone array 115 and a speaker 112, and the memory 120 stores programs or instructions modules 127 configured to perform speech recognition. The audio device 110, the memory 120, and the CPU 130 are communicatively connected through a data bus (D-Bus) 102. In this way, the CPU 130 invokes the microphone array 115 to collect a speech signal sent by a user, runs, based on the collected speech signal, the programs or the instructions 127 of the modules stored in the memory 120, and invokes the speaker 112 to send a speech signal to the user based on a running result.

In addition, refer to FIG. 1. The CPU may also access a cloud service 144 through a gateway 140 to obtain data returned by the cloud service 144. The CPU may further access a controller area network bus (CAN-Bus) 153 through the gateway 150, to read and control a status of another device.

Figure 2:
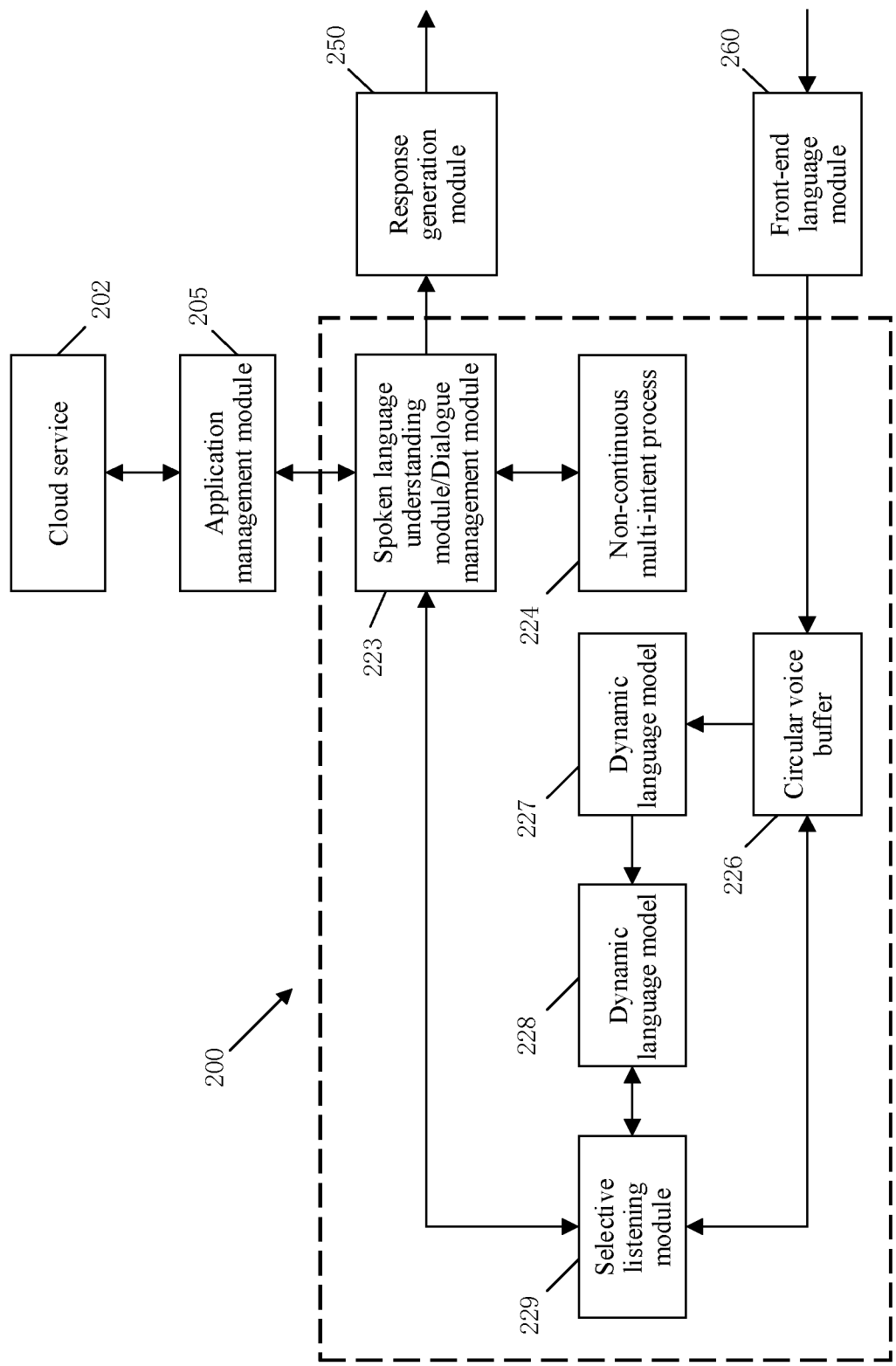
FIG. 2 is a diagram of modules for implementing a speech recognition method according to an embodiment of this application.

Optionally, in the diagram of the implementation environment 100 shown in FIG. 1, the programs or instructions, stored in the memory, of the modules configured to perform speech recognition include programs or instructions such as a circular speech buffer module, an AM, an SL module, a Dynamic LM module, an SLU module, a DM module, and an NCM process in FIG. 2. FIG. 2 is a diagram of modules 200 for implementing a speech recognition method according to an embodiment of this application. The CPU in FIG. 1 runs the programs or instructions, stored in the memory, of the modules, to implement speech recognition. The following describes a speech recognition process with reference to functions of the modules, shown in FIG. 2, for implementing the speech recognition method provided in this embodiment.

A front-end language (front-end speech) module 260 is configured to distinguish a speech signal sent by a user from non-speech signals such as road noise and music, and further configured to perform processing such as noise reduction and enhancement on the speech signal sent by the user, to improve accuracy of subsequent identification and understanding.

The circular speech buffer (circular buffer) module 226 is configured to buffer the speech signal processed by the front-end language model 260, so that a stored speech signal can be recognized and understood for a plurality of times. A circular speech buffer 226 has a reference time length. When a time length of the buffered speech signal is greater than the reference time length, a speech signal with a longest storage time is overwritten by a new speech signal.

The acoustic model (AM) is configured to obtain a speech signal stored in the circular speech buffer module 226, and convert the speech signal into a phoneme sequence.

The selective listening (SL) module 229 is configured to invoke the dynamic language model (Dynamic LM) module 228, convert a phoneme sequence output by the AM model into key words, and send the key words to the spoken language understanding (SLU) module 223.

The SLU module 223 is configured to extract an intent and a semantic slot from the key words, to understand a first intent, a second intent, and an additional intent that are indicated by the speech signal of the user.

The dialogue management (DM) module 223 is configured to request reply information from the cloud service 202 based on the first intent.

An application management (APP Manager) module 205 is configured to convert reply information returned by the cloud service 202 into reply information in a reference format.

The dialogue management (DM) module 223 is further configured to: start a non-continuous multi-intent (NCM) process in a related field based on reply information that is in the reference format and that is returned by the APP manager module 205; and control a response generation (RG) module 250 to generate reply content and perform speech playing. The DM module is further configured to send an instruction to the APP manager module 205 based on the second intent and the additional intent, to control an application or a terminal device to execute service content and the additional intent.

The application management (application manager, APP Manager) module 205 is further configured to perform word segmentation, tagging, and proper noun tagging on the reply information. The application management module 205 is further configured to manage the application and the terminal device according to the instruction sent by the DM module, to control the application or the terminal device to execute the service content and the additional intent.

Figure 3:
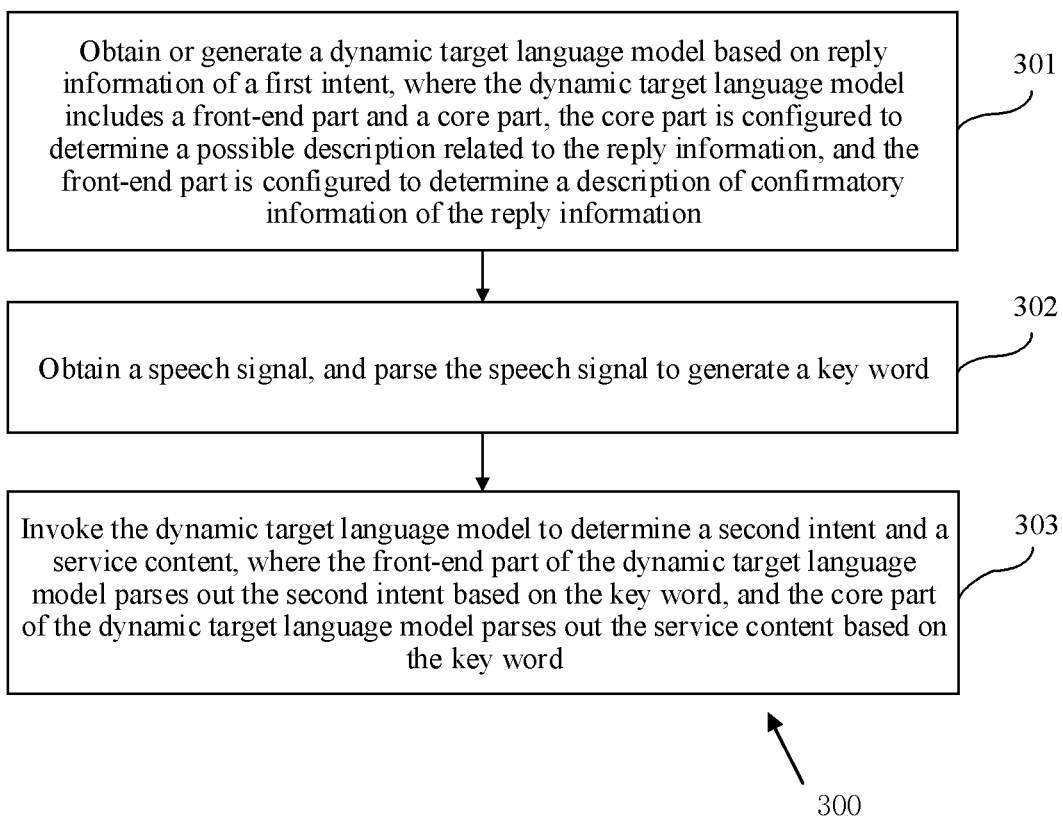
FIG. 3 is a flowchart of a speech recognition method according to an embodiment of this application.

Based on the implementation environment 100 shown in FIG. 1, refer to FIG. 3. FIG. 3 is a flowchart of a speech recognition method 300 according to an embodiment of this application. An embodiment of this application provides a speech recognition method. As shown in FIG. 3, the method includes the following steps.

Step 301: Obtain or generate a dynamic target language model based on reply information of a first intent, where the dynamic target language model includes a front-end part and a core part, the core part is configured to determine a possible description related to the reply information, and the front-end part is configured to determine a description of confirmatory information of the reply information.

The first intent is an intent obtained by parsing a speech instruction signal of a user after a spoken dialogue between the user and a system starts. The foregoing spoken dialogue is used as an example. The speech instruction signal of the user is a speech of "Help me find a nearby Sichuan restaurant" sent by the user. Parsing the speech instruction signal includes: invoking an acoustic model to convert the speech instruction signal into a phoneme sequence, where a phoneme is a minimum phonetic unit of a language, for example, in Chinese, a phoneme refers to an initial or a final; and then, invoking a language model to convert the phoneme sequence into a word sequence, where the word sequence is a speech instruction. The language model refers to a language model that has been trained based on a training set. An appropriate language model may be invoked based on a field to which speech recognition is applied.

After the word sequence is obtained, the word sequence may be parsed to obtain the first intent. The first intent includes an intent and a semantic slot. The semantic slot refers to a vocabulary that is in the word sequence and that has a clear definition or concept. The foregoing spoken dialogue is still used as an example. If the word sequence is "Help me find a nearby Sichuan restaurant", an intent obtained through parsing is "navigation", and the semantic slot is "nearby" and "Sichuan restaurant", so that the obtained first intent is "Navigate to a nearby Sichuan restaurant". Then, the reply information of the first intent may be obtained based on the obtained first intent, and content of the reply information of the first intent meets a requirement of the semantic slot. For a manner of obtaining the reply information, the first intent may be sent to a cloud service, to obtain reply information returned by the cloud service. Alternatively, a mapping relationship between a plurality of intents and reply information may be stored in a memory, and reply information corresponding to the first intent may be searched for based on the mapping relationship, to obtain the reply information.

It should be noted that regardless of a manner of obtaining the reply information, there may be one or more pieces of reply information, and each piece of reply information is a word string. In addition, if there are a plurality of pieces of reply information, the plurality of pieces of reply information may be used as to-be-selected reply information, so that the user can select from the plurality of pieces of reply information. The foregoing spoken dialogue is still used as an example. There may be one piece of reply information, namely "Sichuan restaurant A", or there may be a plurality of pieces of reply information, such as "Sichuan restaurant A", "Sichuan restaurant B", and "Sichuan restaurant C". A quantity of pieces of the reply information is not limited in this embodiment.

Then, the dynamic target language model may be obtained or generated based on the obtained reply information of the first intent, and the dynamic target language model includes the front-end part and the core part. The front-end part is configured to determine the description of the confirmatory information of the reply information, and the confirmatory information includes but is not limited to confirmation information, correction information, cancellation information, or the like. For example, the confirmation information may include "right" and "yes", the correction information may include "not right" and "wrong", and the cancellation information may include "forget it" and "no need". The core part is configured to determine the possible description related to the reply information, for example, a description such as directly retelling the reply information by the user or selectively retelling the reply information by the user.

It should be noted that a process of obtaining or generating the dynamic target language model based on the reply information is described in detail in the following, and details are not described herein. Certainly, regardless of a process of obtaining or generating the dynamic target language model, after the dynamic target language model is obtained or generated, a speech signal may be further received.

Step 302: Obtain a speech signal, and parse the speech signal to generate a key word.

After an in-vehicle module obtains the reply information to the first intent, in addition to obtaining or generating the dynamic target language model based on the reply information to the first intent, the in-vehicle module also sends the reply information of the first intent to the user to obtain the speech signal. It should be noted that the speech signal may include a speech signal of a dialogue between the user and the in-vehicle module, namely, a speech signal for the reply information of the first intent, and may also include an irrelevant speech signal of a dialogue between the user and another user. The foregoing spoken dialogue is still used as an example. The speech signal of a dialogue between the user and the in-vehicle module is "Yes, that is Sichuan restaurant A", and the irrelevant speech signal of the dialogue between the user and the another user is "It is noon. Is there any problem with parking?". Certainly, the foregoing irrelevant speech signal may include a speech signal of a dialogue in which the user actively talks to another user, and may also include a speech signal of a dialogue in which the another user actively talks to the user, namely, a speech signal of a speech interposed by the another user. The irrelevant speech signal is not limited in this embodiment.

After obtaining the speech signal, the in-vehicle module may parse the speech signal to generate the key word. Optionally, in this embodiment, before the obtaining a speech signal, the method further includes: buffering a historical speech signal. In this case, the parsing the speech signal to generate a key word includes: parsing the speech signal, and performing context detection by using the historical speech signal to generate the key word.

The historical speech signal is a speech signal of a past time. For example, in the foregoing spoken dialogue, the speech instruction signal "Help me find a nearby Sichuan restaurant" used to obtain the first intent may be used as the historical speech signal. In this embodiment, the historical speech signal may be buffered by using a circular buffer. The circular buffer has a reference time length. If a time length of the buffered historical speech signal is greater than the reference time length, a historical speech signal with a longest buffer time is overwritten by a new speech signal. In this case, if the historical speech signal needs to be used, the historical speech signal is read from the circular buffer. Certainly, a manner of buffering the historical speech signal is not limited in this embodiment, and another manner may be selected based on a requirement to buffer a historical speech.

Further, for a manner of parsing the speech signal, the in-vehicle module may still invoke an appropriate acoustic model and a language model based on the field to which speech recognition is applied, and parse the speech signal by using the acoustic model and the language model, to obtain an initial key word. Because the speech signal of the dialogue between the user and the in-vehicle module is for the reply information of the first intent, the initial key word generated by parsing the speech signal of the dialogue between the user and the in-vehicle module is related to the first intent. However, an initial key word generated by parsing the irrelevant speech signal of the dialogue between the user and the another user is irrelevant to the first intent.

Therefore, the historical speech signal needs to be used to perform context detection, so that a key word generated based on the initial key word is related only to the first intent, in other words, initial key words irrelevant to the first intent are ignored.

A manner of performing context detection by using the historical speech signal may include: detecting a key word, in initial key words, related to the historical speech signal, so that a key word related to a word sequence corresponding to the historical speech signal is used as a generated key word. For example, a speech signal "It is noon. Is there any problem with parking? Yes, that is Sichuan restaurant A" is parsed, and obtained initial key words include "noon", "parking", "yes, that is", and "Sichuan restaurant A". In the initial key words, key words related to the historical speech signal "help me find a nearby Sichuan restaurant" include "yes, that is" and "Sichuan restaurant A". Therefore, "noon" and "parking" can be ignored, and only "yes, that is" and "Sichuan restaurant A" are used as generated key words.

Certainly, the manner of performing context detection by using the historical speech signal is not limited in this embodiment. Regardless of a manner of detecting and generating a key word, after the key word is generated, the dynamic target language model may be triggered and invoked to parse the key word, to determine a second intent and service content. Details are described in step 203.

Step 303: Invoke the dynamic target language model to determine the second intent and the service content, where the front-end part of the dynamic target language model parses out the second intent based on the key word, and the core part of the dynamic target language model parses out the service content based on the key word.

It can be learned from the description in step 201 that the dynamic target language model includes the front-end part and the core part. Because the dynamic target language model is obtained based on the reply information of the first intent, both the second intent and the service content that are determined by using the dynamic target language model are related to the first intent. The front-end part is configured to determine the description of the confirmatory information of the reply information. Therefore, confirmatory information in the key word may be obtained by parsing the key word by using the front-end part, and the second intent of the user is further obtained by using the confirmatory information in the key word. The foregoing spoken dialogue is used as an example. The reply information of the first intent is "Do you want to go to Sichuan restaurant A?", and key words obtained through parsing are "yes, that is" and "Sichuan restaurant A". In this case, "yes, that is" in the key words may be obtained through parsing by using the front-end part, and then, the second intent "go to Sichuan restaurant A" of the user is obtained.

In addition, the "Sichuan restaurant A" in the key words is obtained through parsing by using the core part, and the service content "navigate to Sichuan restaurant A" is obtained with reference to a current in-vehicle navigation scenario.

It can be learned that if the reply information of the first intent includes only one option, the second intent of the user can be determined by using the front-end part. If the reply information of the first intent includes two or more options, the second intent of the user can be determined by using the front-end part and the core part. For example, if the reply information of the first intent is "Which of the following do you want to choose? A first option is Sichuan restaurant A and a second option is Sichuan restaurant B", and key words obtained by parsing are still "yes, that is" and "Sichuan restaurant A", confirmatory information "yes, that is" in the key words can still be parsed by using the front-end part. However, whether the second intent of the user is "Sichuan restaurant A" or "Sichuan restaurant B" cannot be determined by using only "yes, that is". Therefore, "Sichuan restaurant A" in the key words needs to be obtained through parsing by using the core part, to finally determine that the second intent of the user is "go to Sichuan restaurant A" and the service content is "navigate to Sichuan restaurant A".

It should be noted that, if confirmatory information obtained by parsing the key word by the front-end part includes confirmation information, for example, "yes, that is" in the foregoing spoken dialogue, the key word may be further parsed by using the core part to obtain the service content. If the confirmatory information obtained by parsing the key word by the front-end part includes correction information or cancellation information, for example, vocabularies such as "no" and "incorrect", it indicates that the user does not approve the reply information, and may not respond to the reply information, and the service content does not need to be obtained through parsing by using the core part. Instead, another piece of reply information is re-obtained, and a new dynamic target language model is obtained based on the another piece of reply information, to complete speech recognition by using the new dynamic target language model.

Certainly, in addition to the second intent and the service content, information such as confidence levels of the second intent and the service content and a mute signal segment in the speech signal may be further obtained by invoking the dynamic target language model, where the confidence levels are used to indicate accuracy of the second intent and the server content.

After the second intent and the service content are obtained, a service indicated by the service content may be triggered and provided. For example, the service content in the foregoing spoken dialogue is "navigate to Sichuan restaurant A". In this case, the service content is executed, including invoking a navigation device to navigate the user from a current location (namely, a location at which the foregoing spoken dialogue occurs) to a location at which "Sichuan restaurant A" is located.

In an optional implementation, before the service content is executed, the method provided in this embodiment further includes: confirming the second intent, to obtain a confirmed second intent; and executing the confirmed second intent. In this implementation, it is considered that although the dynamic target language model is obtained or generated based on the reply information of the first intent, the second intent and the service content that are determined by using the dynamic target language model may still be inconsistent with the first intent. Therefore, before the service content is executed, the second intent is confirmed to ensure that the second intent is consistent with the first intent. After the confirmed second intent is obtained, the confirmed second intent is executed.

That the second intent is consistent with the first intent includes but is not limited to: The second intent corresponds to the reply information of the first intent (for example, the second intent "go to Sichuan restaurant A" corresponds to the reply information "Sichuan restaurant A" of the first intent). Alternatively, the second intent meets a restriction included in the first intent (for example, the second intent "go to Sichuan restaurant A" meets a distance restriction "nearby" included in the first intent).

Optionally, a manner of confirming the second intent, to obtain the confirmed second intent includes: sending confirmation information of the second intent to the user, obtaining a second intent fed back by the user, and using the second intent fed back by the user as the confirmed second intent.

It can be learned from the foregoing description that the confidence levels of the second intent and the service content may be obtained by using the dynamic target language model. Therefore, in this embodiment, different pieces of confirmation information may be sent to the user based on different confidence levels, to confirm the second intent. For example, the second intent is "go to Sichuan restaurant A". If the confidence level is higher than a threshold, it indicates that the second intent is relatively reliable. Therefore, the second intent may be confirmed in an indirect confirmation manner. For example, a speech "You select Sichuan restaurant A" for determining that the second intent is correct by default is sent to the user as confirmation information of the second intent, to obtain a second intent returned by the user. If the confidence level is not higher than the threshold, it indicates that the confidence level of the second intent is relatively low. Therefore, the second intent is confirmed in a direct confirmation manner. For example, a speech "Are you sure you want to select Sichuan restaurant A?" is sent to the user.

Confirmation information sent in the indirect confirmation manner and confirmation information sent in the direct confirmation manner are both speech confirmation information. If the second intent fed back by the user still cannot be obtained by using the speech confirmation information, another form of confirmation information, for example, text confirmation information, may be selected to confirm the second intent for the user. Optionally, a terminal displays the reply information of the first intent to the user, so that the user selects any reply information by using the terminal, uses an intent indicated by the reply information selected by the user as the confirmed second intent, and executes the confirmed second intent, to complete speech recognition.

Next, the foregoing spoken dialogue is extended to obtain a following complex dialogue:

User: (To the in-vehicle module) Help me find a nearby Sichuan restaurant.

In-vehicle module: (To the user) Do you want to go to Sichuan restaurant A?

User: (To the another user in the vehicle) It is noon. Is there any problem with parking? (To the in-vehicle module) Yes, that is Sichuan restaurant A. In addition, help me find a parking space.

It can be learned that, in this complex dialogue, after the user expresses "Yes, that is Sichuan restaurant A", the user further expresses an additional intent "in addition, help me find a parking space", so that this complex dialogue forms a multi-intent dialogue.

In this regard, in an optional implementation, the dynamic target language model further includes a rear-end part, and the rear-end part is configured to determine whether an additional intent exists. Therefore, the method provided in this embodiment further includes: invoking the dynamic target language model to determine an additional intent, and parsing out, by using the rear-end part of the dynamic target language model, the additional intent based on a key word, to recognize each intent in the foregoing multi-intent dialogue.

Figure 4:
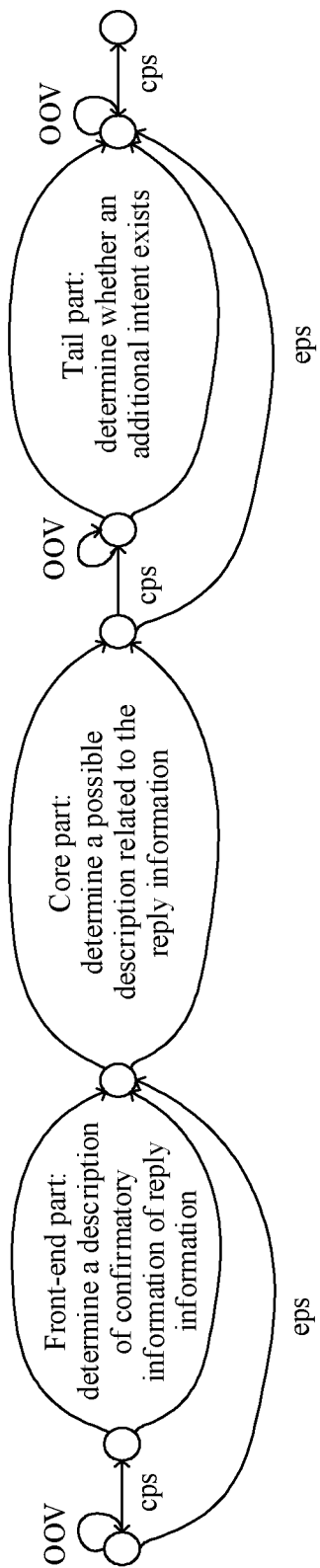
FIG. 4 is a diagram of a structure of a language model according to an embodiment of this application.

In this implementation, in addition to obtaining the second intent by using the front-end part and obtaining the service content by using the core part, the key word are further parsed by using the rear-end part to obtain the additional intent. For a diagram of the front-end part, the core part, and the rear-end part, refer to FIG. 4. In FIG. 4, an out of vocabulary (OOV) represents a vocabulary beyond a dictionary, and the dictionary is used to obtain a word based on a phoneme sequence. eps represents a jumping edge and is used to indicate an optional part.

Optionally, the rear-end part includes a rear-end indicator word, and the rear-end indicator word includes but is not limited to vocabularies such as "in addition", "also", and "by the way". For example, in the foregoing multi-intent dialogue, the rear-end indicator word is "in addition". Because a description of the rear-end indicator word by the user is usually relatively fixed, a set including a plurality of rear-end indicator words may be used as a corpus to train a language model, and a trained language model is used as a rear-end part. Therefore, the invoking the dynamic target language model to determine an additional intent, and parsing out, by using the rear-end part of the dynamic target language model, the additional intent based on the key word includes: parsing out, based on the key word by using the rear-end part, a reference rear-end indicator word and a time point at which the reference rear-end indicator word is located; updating the dynamic target language model based on the reference rear-end indicator word with reference to the first intent and the second intent, to obtain an updated target language model; and invoking the updated target language model, to parse out the additional intent based on the key word and the time point at which the reference rear-end indicator word is located.

The reference rear-end indicator word is one word in a set of a plurality of rear-end indicator words that are used as corpuses. If the reference rear-end indicator word exists, it indicates that there is no additional intent, and the service indicated by the foregoing service content may be directly provided. If the reference rear-end indicator word does not exist, it indicates that there is an additional intent, and in this case, the rear-end part further obtains the time point at which the reference rear-end indicator word is located.

If the reference rear-end indicator word exists, a language model is further invoked based on the first intent and the second intent. The language model may be a language model in a field in which the first intent and the second intent are located. For example, in the foregoing multi-intent dialogue, if the field in which the first intent and the second intent are located is "navigation", a language model in the navigation field may be obtained to replace the dynamic target language model, to obtain the updated target language model.

Then, the updated target language model is invoked to parse a key word after the time point at which the reference rear-end indicator word is located, to obtain the additional intent of the user. For example, in the foregoing multi-intent spoken dialogue, the reference rear-end indicator word is "in addition". A speech signal before a time point at which "in addition" is located is "It is noon. Is there any problem with parking? Yes, that is Sichuan restaurant A." Key words included in the speech signal have been parsed by the front-end part and the core part of the dynamic target language model. Therefore, the updated target language model may be invoked to parse a key word included in a speech signal after the time point at which "in addition" is located, namely, a key word included in "help me find a parking space", to obtain the additional intent of the user.

Figure 5:
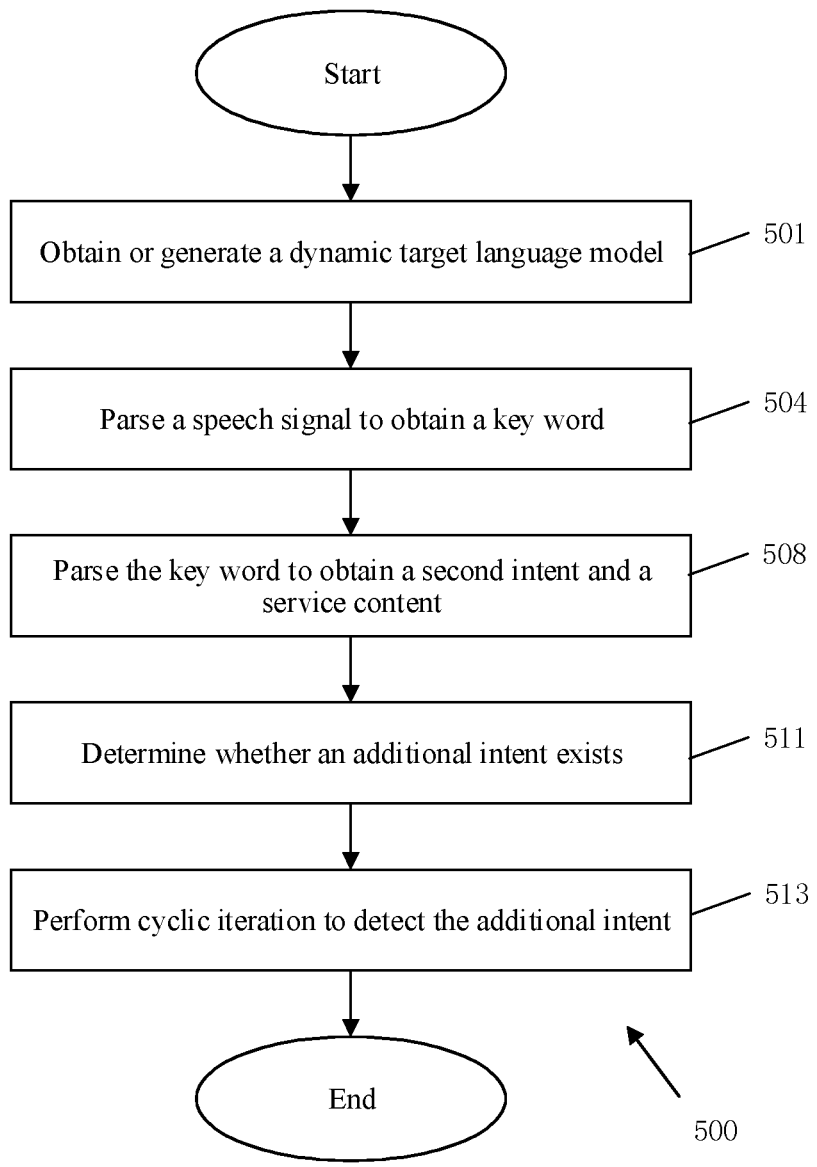
FIG. 5 is a flowchart of speech recognition according to an embodiment of this application.

It should be noted that this embodiment further provides another method for updating the target language model: After a language model is obtained based on the first intent and the second intent, a combined model of the language model and the rear-end part is used as the updated target language model. Therefore, refer to FIG. 5. After obtaining an additional intent through parsing, the updated target language model may perform cyclic iteration to detect whether more additional intents exist. This increases a quantity of intents that can be recognized.

In addition, if an additional intent exists, after the additional intent is obtained through parsing by using the updated target language model, the second intent is executed by using a following method. The method includes: if an additional intent exists, executing service content and the additional intent. After the service content is obtained, the service content is not executed immediately. Instead, whether an additional intent exists in a speech signal is first determined by using the rear-end part. If the additional intent exists, the additional intent is obtained, and finally the service content and the additional intent are executed. The obtained service content is executed only if it is determined by using the rear-end information that no additional intent exists in the speech signal.

Further, the executing service content and the additional intent includes: executing the service content and the additional intent together, or executing the service content and the additional intent in sequence. For example, if the service content is "navigate to Sichuan restaurant A" and the additional intent is "play a song", the additional intent may be executed in a process of executing the service content, that is, the service content and the additional intent are executed together. If the service content is "navigate to Sichuan restaurant A" and the additional intent is "find a parking space", the service content and the additional intent need to be executed in sequence. In addition, different service content and additional intents may be executed by different execution bodies. For example, the different service content and additional intents may be executed by a third-party cloud service, may be executed by an in-vehicle module, may be executed by a vehicle-mounted terminal, or may be executed by an automotive enterprise. The vehicle-mounted terminal may be another terminal other than the in-vehicle module on a vehicle, for example, a vehicle-mounted display, a vehicle-mounted air conditioner, or a vehicle-mounted speaker. Certainly, the different service content and additional intents may alternatively be executed by two or more of the third-party cloud service, the in-vehicle module, the vehicle-mounted terminal, and the automotive enterprise. This is not limited in this embodiment of this application.

The following describes in detail a process of obtaining or generating the dynamic target language model based on the reply information of the first intent in the foregoing step 201. Optionally, the obtaining or generating the dynamic target language model based on the reply information of the first intent includes: converting the reply information of the first intent into a reference format to obtain reply information in the reference format, and obtaining or generating the dynamic target language model based on the reply information in the reference format.

It can be learned from the foregoing description that the dynamic target language model includes at least a front-end part and a core part, and may further include a rear-end part. The front-end part is configured to determine a description of confirmatory information of the reply information. Similar to the rear-end part, because the confirmatory information of the reply information is described relatively fixedly by a user, for the front-end part, a set including a plurality of pieces of confirmatory information used for confirmation, correction, or cancellation may be used as a corpus to train a language model. A trained language model is used as the front-end part, so that the front-end part has a capability of parsing a key word to obtain confirmatory information such as confirmation information, correction information, or cancellation information. The core part needs to be obtained based on the reply information in the reference format described above.

The reply information may be provided by a plurality of providers. Because different providers may provide reply information in different formats, the reply information needs to be converted into the reference format, to unify formats of the reply information, and facilitate receiving of the reply information. In different application fields, the reply information may be converted into different reference formats, so that reply information formats in a same application field are the same. For example, in an in-vehicle navigation field, the reply information is usually an address. Therefore, the address can be unified in a format of a country (or region), a province (or state), a city, a district, a road, and a house number. For another example, in a point of interest (POI) field, the reply information is usually related to a point of interest. Therefore, the reply information may be unified in a format of a class name, an address, a phone number, and a user comment. The class name can be a hotel, a restaurant, a mall, a museum, a concert hall, a cinema, a stadium, a hospital, or a drugstore.

In addition, before the reply information is converted into the reference format, word segmentation and tagging may be performed on the reply information, to facilitate implementation of converting the reference format. Word segmentation and tagging refer to decomposing a word string into vocabularies, and if the vocabularies obtained through decomposition include a proper noun, the proper noun may be tagged. Both word segmentation and tagging may be implemented by using an artificial intelligence algorithm. In this embodiment, the artificial intelligence algorithm includes but is not limited to a conditional random field (CRF), a long short term memory (LSTM) network, and a hidden Markov model (HMM).

In this embodiment, after the reply information in the reference format is obtained, the dynamic target language model is further obtained or generated based on the reply information in the reference format. Optionally, there are following three manners of obtaining the target language model based on the reply information in the reference format:

First obtaining manner: converting a trained language model into a weighted finite state transducer, and using the weighted finite state transducer as the dynamic target language model, where the trained language model is obtained by training the reply information in the reference format and a reference vocabulary.

The reference vocabulary includes but is not limited to a class name corresponding to a vocabulary in the reply information in the reference format, and a representative expression word. The vocabularies in the reply information in the reference format may be obtained in a manner, for example, word segmentation and tagging, to further obtain the class names corresponding to the vocabularies. For example, a class name of "Sichuan restaurant A" is "restaurant". The representative expression word is used to refer to any piece of reply information in the reference format. For example, when there are a plurality of pieces of reply information in the reference format, the representative expression word includes "the first option", "the one in the middle", "the second-to-last one", "the last option", and the like.

Figure 6:
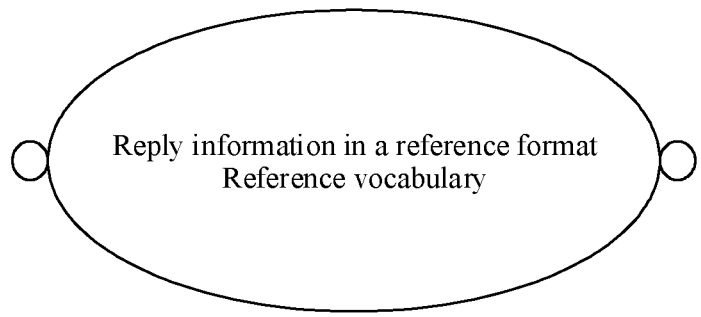
FIG. 6 is a diagram of a structure of a language model according to an embodiment of this application.

The trained language model includes an initial language model trained by using the reply information in the reference format and the reference vocabulary as corpuses. Optionally, the initial language model may be an N-gram model. For a diagram of the N-gram model, refer to FIG. 6. In the N-gram model, it is assumed that an occurrence probability of a word is related only to N words preceding the word, but is not related to other words. For example, when a value of N is 3, the N-gram model is a third-order model, and in this case, an occurrence probability of a word is related to two words before the word, that is, an occurrence probability of an $i^{th}$ word $X_i$ is $P(X_i|X_{i-1}, X_{i-2})$. Therefore, the N-gram model can calculate a probability that one word occurs after another word, that is, a probability that two words occur adjacently. The N-gram model is trained by using a corpus, to obtain a trained N-gram model, and the trained N-gram model has calculated a probability that words included in the corpus occur adjacently.

Further, the trained language model may be converted into a weighted finite state transducer (WFST). The WFST can convert an input phoneme sequence into words based on a dictionary, obtain, based on the probability, calculated by the trained language model, that the words occur adjacently, weights of the words that occur adjacently, and output core information based on the weights. The core information may be considered as a word sequence, and therefore, an occurrence probability of the core information is a product of weights of all words that are included in the word sequence and that occur adjacently.

In addition, a parsing range of the trained language model may be expanded through conversion, the trained language model may obtain the vocabularies in the reply information and the reference vocabulary by parsing key words, and the WFST obtained through conversion may obtain the vocabularies in the reply information and the reference vocabulary through parsing, and may also obtain a combination of two or three of the vocabularies in the reply information, the class names corresponding to the vocabularies, or the representative expression word. For example, the WFST may parse a combination "the restaurant in the middle" of the representative expression word and the class names corresponding to the vocabularies, and the like.

It can be learned that the WFST is the core part of the dynamic target language model. Then, the WFST and the front-end part (or the WFST, the front-end part, and the rear-end part) can be as the dynamic target language model.

Second obtaining manner: converting a trained language model into a weighted finite state transducer, and using the weighted finite state transducer as a first language model, where the trained language model is obtained by training reply information that is in the reference format and the length of the reply information is not less than a reference length; obtaining a second language model based on reply information that is in the reference format and the length of the reply information is less than the reference length; obtaining a third language model based on a reference vocabulary; and combining the first language model, the second language model, and the third language model to obtain a total language model, and using the total language model as the dynamic target language model.

For the reference vocabulary, refer to the description in the first obtaining manner. Details are not described herein again. Compared with the first obtaining manner, in the second obtaining manner, the reply information whose length is less than the reference length and the reference vocabulary are not used as corpuses, but only the reply information whose length is not less than the reference length is used as a corpus. The trained language model is an initial language model trained by using the reply information whose length is not less than the reference length as a corpus, and the initial language model may still be an N-gram model. In an optional implementation, the reference length is 2, namely, two words.

A reason is that the N-gram model uses a back-off algorithm. The back-off algorithm means that, for a word sequence that has not appeared in a corpus, an occurrence probability of a lower-order word sequence may be used as an occurrence probability of the word sequence, to ensure that the N-gram model can output a result for any input phoneme sequence. For example, if a word sequence $(X_{i-2}, X_{i-1}, X_i)$ does not exist in a corpus of a third-order model, the model does not calculate an occurrence probability $P(X_i|X_{i-1}, X_{i-2})$ of an $X_i^{th}$ word. If the word sequence $(X_{i-2}, X_{i-1}, X_i)$ is used by the user, the $P(X_i|X_{i-1}, X_{i-2})$ is estimated based on $P(X_i|X_{i-1})$ of a lower order (second order), to parse $(X_{i-2}, X_{i-1}, X_i)$.

The trained language model is used to determine the possible description related to the reply information, and the user usually sends different speech signals for reply information of different lengths to retell the reply information, to confirm or select the reply information. For the reply information whose length is less than the reference length, the user usually retells the entire reply information instead of retelling some words in the entire reply information. If the N-gram model including the back-off algorithm is trained by using the reply information whose length is less than the reference length as a corpus, some word sequences with a relatively low occurrence probability are calculated by the trained language model. This affects a parsing effect of the trained language model. The reference length may be set based on a scenario or experience, or may be adjusted in a speech recognition process. This is not limited in this embodiment of this application.

For example, in an in-vehicle navigation scenario, "the Oriental Pearl TV Tower" can be used as reply information whose length is 1. If "the Oriental Pearl TV Tower (Dong Fang Ming Zhu)" is used as a corpus, the trained language model will provide word sequences such as "Dong Ming" and "Fang Zhu", and an occurrence probability of the word sequences is low. Therefore, in this embodiment, the second language model that does not use the back-off algorithm is obtained based on the reply information whose length is less than the reference length, and the second language model parses only reply information in key words, and the entire length of the reply information is less than the reference length.

In addition, for a reference vocabulary that includes a class name corresponding to a vocabulary and a representative expression word, an expression manner of the user is relatively fixed, and a quantity of combinations of the class names corresponding to the vocabularies and the representative expression words is relatively limited. Therefore, the class names corresponding to the vocabularies, the representative expression words, and the combinations of the class names and the representative expression words can be used as corpuses for training to obtain the third language model that does not use the back-off algorithm.

However, for the reply information whose length is not less than the reference length, the user usually selects some words in the entire reply information for retelling. Therefore, the reply information whose length is not less than the reference length may be used as a corpus to train an N-gram model, to obtain the trained language model. Then, the trained language model is converted into a WFST, to obtain the first language model that uses the back-off algorithm. The first language model may parse the entire reply information in the key words or a combination of words included in the entire reply information. For example, in the in-vehicle navigation scenario, if the reference length is 2, "No. 1 Avenue D, District C, City B, Province A" is a piece of reply information whose length is greater than the reference length. The user may select word sequences such as "City B" and "No. 1 Avenue D" for retelling. Therefore, a key word included in a speech signal retold by the user may be parsed by using the first language model that uses the back-off algorithm.

Figure 7:
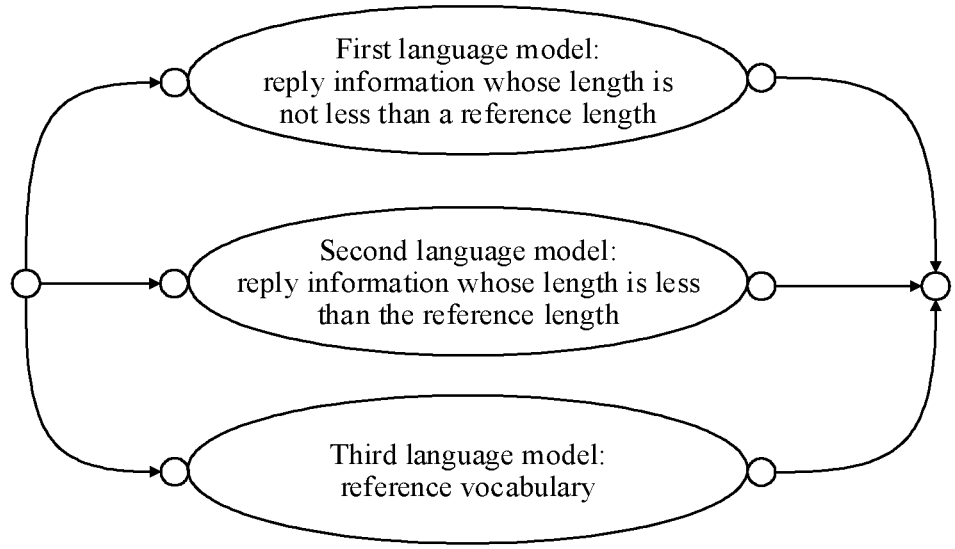
FIG. 7 is a diagram of a structure of a language model according to an embodiment of this application.

After the first language model, the second language model, and the third language model are obtained, as shown in FIG. 7, the first language model, the second language model, and the third language model are combined to obtain a total language model, and the total language model is the core part of the dynamic target language model. The total language model and the front-end part (or the total language model, the front-end part, and the rear-end part) form the dynamic target language model.

Third obtaining manner: obtaining a word confusion network based on reply information that is in the reference format and the length of the reply information is not less than a reference length, where each vocabulary in the word confusion network has a transition probability; calculating a penalty weight of each vocabulary, converting the word confusion network into a weighted finite state transducer based on the penalty weight of each vocabulary, and using the weighted finite state transducer as a first language model; obtaining a second language model based on reply information that is in the reference format and the length of reply information is less than the reference length; obtaining a third language model based on a reference vocabulary; and combining the first language model, the second language model, and the third language model to obtain a total language model, and using the total language model as the dynamic target language model.

For a description of the reference vocabulary, refer to the first obtaining manner. For descriptions of obtaining the second language model based on the reply information whose length is less than the reference length, and obtaining the third language model based on the reference vocabulary, refer to the second obtaining manner. Details are not described herein again. The following describes a process of obtaining the first language model.

A method for obtaining the word confusion network includes: performing word alignment on vocabularies of a same category in all pieces of reply information whose length is not less than the reference length, and adding one to a quantity of categories to obtain a quantity of states in the word confusion network. Then, the states are connected by using arcs, and each arc has a vocabulary and a transition probability corresponding to the vocabulary. The transition probability is used to indicate an occurrence frequency of the vocabulary in a category in which the vocabulary is located. In addition, a sum of transition probabilities on all arcs between two adjacent states is 1.

Figure 8:
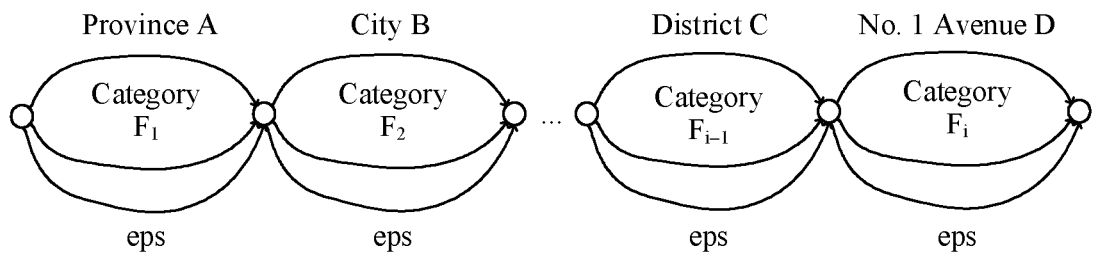
FIG. 8 is a diagram of a structure of a word confusion network according to an embodiment of this application.

Further, when retelling reply information with a relatively large length, the user often selects vocabularies in a skipping manner from all vocabularies included in the entire reply information for retelling. Therefore, a skipping edge needs to be added between every two states in the word confusion network, to facilitate parsing a key word included in a speech signal in which vocabularies are selected by the user in a skipping manner. For example, in a word confusion network shown in FIG. 8, eps represents a skipping edge, and $F_t$ is used to distinguish between different categories.

Then, the penalty weight of each vocabulary is calculated, and the word confusion network is converted into a WFST based on the penalty weight to obtain the first language model. It should be noted that, when the first language model is used to parse the key word, the first language model calculates penalty weights of a plurality of word sequences that may correspond to a phoneme sequence of the speech signal. A penalty weight of a word sequence is equal to a product of penalty weights of vocabularies included in the word sequence, and a word sequence with a smallest penalty weight value is output. Optionally, a manner of calculating the penalty weight of each vocabulary includes but is not limited to the following three manners:

First calculation manner: for any vocabulary, using a negative logarithm value of a transition probability of the vocabulary as the penalty weight.

It can be learned from the foregoing description that the transition probability of a vocabulary is used to indicate a frequency of occurrence of the vocabulary in a category in which the vocabulary is located, and a higher frequency of occurrence of the vocabulary in the category in which the vocabulary is located indicates a larger transition probability, and a smaller negative logarithm value of the transition probability, that is, the penalty weight is inversely proportional to the frequency of occurrence. In this way, a target language model can better parse out a vocabulary that has a higher frequency of occurrence in the category in which the vocabulary is located.

Second calculation manner: for any vocabulary, using a logarithm value of a quantity of pieces of reply information that is in the reference format and the reply information includes the vocabulary as the penalty weight.

When retelling a to-be-selected reply information from a plurality of pieces of reply information with a relatively large length, the user is more inclined to select a vocabulary, namely, a vocabulary with strong distinctiveness, that is in the to-be-selected reply information and that is significantly different from that in another reply information for retelling. For example, when the user retells the former one of "No. 1 Avenue D, District C, City B, Province A" and "No. 2 Road F, District E, City B, Province A", the vocabulary "Province A" or "City B" that appears in both of the two pieces of information is usually not selected. Instead, the vocabulary "District C" or "No. 1 Avenue D" that only appears in the previous information is selected for retelling.

In this embodiment, a strength of distinctiveness of a vocabulary is defined according to the following formula:

$$IPF(T_{Fi}) = \text{Log}\left(\frac{N}{n}\right)$$

An inverse presence frequency (IPF) is used to indicate a strength of distinctiveness of a vocabulary, and a larger value of the IPF indicates a stronger distinctiveness of the vocabulary. $T_{Fi}$ is used to represent a vocabulary in a category $F_i$, N is a total quantity of pieces of reply information in the reference format, and n is a quantity of pieces of reply information that is in the reference format and that includes the vocabulary $T_{Fi}$. It can be learned that a larger quantity of pieces of reply information that is in the reference format and that includes the vocabulary indicates a smaller IPF value, and weaker distinctiveness of the vocabulary.

When the skipping edge is considered, the total quantity of pieces of reply information in the reference format changes from N to (N+1), and $IPF(T_{Fi})$ is updated and is expressed according to the following formula:

$$IPF(T_{Fi}) = \text{Log}\left(\frac{N+1}{n}\right)$$

In addition, assuming that the skipping edge is not distinguishable, in other words, the skipping edge appears in each piece of reply information in the reference format, IPF(skip) of the skipping edge may be represented as:

$$IPF(\text{skip}) = \text{Log}\left(\frac{N+1}{N+1}\right) = 0$$

In this embodiment, the foregoing IPF(skip) may also be rewritten, to avoid that an IPF value of the skipping edge is always equal to 0. The rewritten IPF(skip) is represented according to the following formula:

$$IPF(\text{skip}) = \text{Log}\left(\frac{N+1}{N}\right)$$

Further, a penalty weight of a vocabulary may be defined based on the $IPF(T_{Fi})$ according to the following formula, and the obtained penalty weight of the vocabulary is a logarithm value of a quantity of pieces of reply information that is in the reference format and that includes the vocabulary:

$$\text{Penalty}(T_{Fi}) =$$
$$\text{Log}(N+1) - IPF(T_{Fi}) = \text{Log}(N+1) - \text{Log}\left(\frac{N+1}{n}\right) = \text{Log}(n)$$

Correspondingly, a penalty weight Penalty (skip) of the skipping edge may be defined as:

$$\text{Penalty}(\text{skip}) = \text{Log}(N+1) - IPF(\text{skip})$$
$$= \text{Log}(N+1) - \text{Log}\left(\frac{N+1}{N}\right)$$
$$= \text{Log}(N)$$

It can be learned that, in this calculation manner, a smaller penalty weight is given to vocabularies with strong distinctiveness, namely, vocabularies included in a relatively small quantity of pieces of reply information in the reference format, so that the target language model can better parse out these vocabularies with strong distinctiveness.

Third calculation manner: for any vocabulary, using a logarithm value of a quantity of times of occurrence of the vocabulary in each piece of reply information in the reference format as the penalty weight.

In the third calculation manner, a strength of distinctiveness of a vocabulary may still be defined according to the following formula:

$$IPF(T_{Fi}) = \text{Log}\left(\frac{N}{n}\right)$$

However, different from the second calculation manner, N represents a total quantity of vocabularies included in each piece of reply information in the reference format, and n represents a quantity of times of occurrence of the vocabulary $T_{Fi}$ in each piece of reply information in the reference format. Then, based on the formulas in the second calculation manner, a penalty weight Penalty $(T_{Fi})$ of the vocabulary $T_{Fi}$ may be defined as follows, so that the penalty weight of the vocabulary is obtained as a logarithm value of a quantity of times of occurrence of the vocabulary in each piece of reply information in the reference format:

$$\text{Penalty}(T_{Fi}) = \text{Log}(n)$$

It can be learned that vocabularies with strong distinctiveness, namely, vocabularies with a smaller quantity of times of occurrence, have smaller penalty probabilities, so that the dynamic target language model can better parse out the vocabularies with strong distinctiveness.

Regardless of a calculation manner of obtaining the first language model, after the first language model is obtained, the first language model, the second language model, and the third language model can be combined to obtain a total language model, and the total language model is the core part of the dynamic target language model. Then, the total language model and the front-end part (or the total language model, the front-end part, and the rear-end part) can form the dynamic target language model.

In conclusion, in this embodiment of this application, the dynamic target language model that includes the front-end part and the core part is obtained or generated based on the reply information of the first intent, the speech signal is parsed to obtain the key word, and then the dynamic target language model is invoked to parse the key word to obtain the second intent and the service content. Because the dynamic target language model is obtained based on the reply information of the first intent, both the second intent and the service content that are obtained through parsing by using the dynamic target language model are related to the first intent. Therefore, in this embodiment of this application, speeches irrelevant to the first intent are ignored, so that provided service content does not deviate from a user requirement, a recognition effect is good, and user experience is improved.

In addition, in this embodiment of this application, the rear-end part in the dynamic target language model is configured to determine whether a speech signal has a plurality of intents, to provide a service indicated by each intent of the user. Therefore, user experience is further improved.

Figure 9:
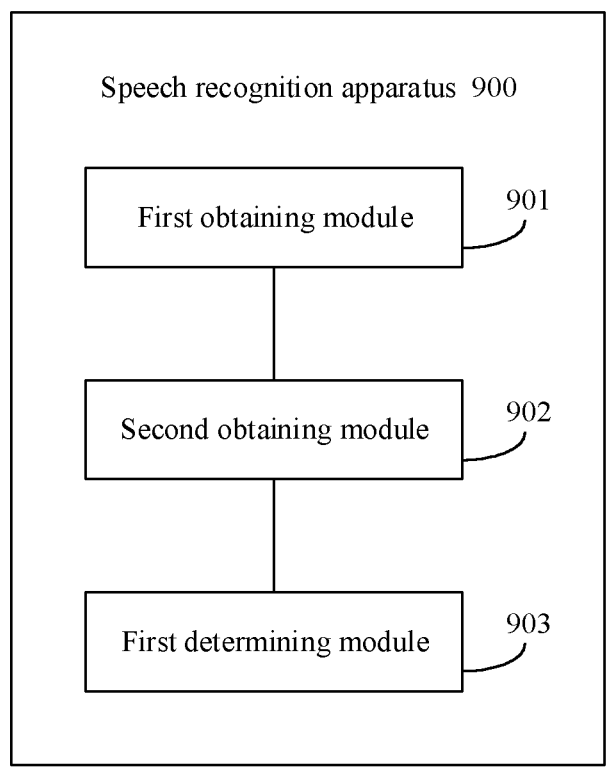
FIG. 9 is a diagram of a structure of a speech recognition apparatus according to an embodiment of this application.

As shown in FIG. 9, an embodiment of this application further provides a speech recognition apparatus. The apparatus includes:

a first obtaining module 901, configured to obtain or generate a dynamic target language model based on reply information of a first intent, where the dynamic target language model includes a front-end part and a core part, the core part is configured to determine a possible description related to the reply information, and the front-end part is configured to determine a description of confirmatory information of the reply information;

a second obtaining module 902, configured to obtain a speech signal, and parse the speech signal to generate a key word; and a first determining module 903, configured to invoke the dynamic target language model to determine a second intent and service content, where the front-end part of the dynamic target language model parses out the second intent based on the key word, and the core part of the dynamic target language model parses out the service content based on the key word.

Optionally, the dynamic target language model further includes a rear-end part, and the rear-end part is configured to determine whether an additional intent exists. The apparatus further includes:

a second determining module, configured to invoke the dynamic target language model to determine an additional intent, where the rear-end part of the dynamic target language model parses out the additional intent based on the key word.

Optionally, the rear-end part includes a rear-end indicator word.

The second determining module is configured to: parse out, based on the key word by using the rear-end part, a reference rear-end indicator word and a time point at which the reference rear-end indicator word is located; update the dynamic target language model based on the reference rear-end indicator word with reference to the first intent and the second intent, to obtain an updated target language model; and invoke the updated target language model, to parse out the additional intent based on the key word and the time point at which the reference rear-end indicator word is located.

Optionally, the apparatus further includes:
a buffer module, configured to buffer a historical speech signal.

The second obtaining module 902 is configured to parse the speech signal, and perform context detection by using the historical speech signal to generate the key word.

Optionally, the apparatus further includes: a confirmation module, configured to confirm the second intent, to obtain a confirmed second intent.

Optionally, the confirmation module is configured to send confirmation information of the second intent to a user, obtain a second intent fed back by the user, and use the second intent fed back by the user as the confirmed second intent.

Optionally, the first obtaining module 901 is configured to convert the reply information of the first intent into a reference format to obtain reply information in the reference format, and obtain or generate the dynamic target language model based on the reply information in the reference format.

Optionally, the first obtaining module is configured to convert a trained language model into a weighted finite state transducer, and use the weighted finite state transducer as the dynamic target language model, where the trained language model is obtained by training the reply information in the reference format and a reference vocabulary.

Optionally, the first obtaining module 901 is configured to: convert a trained language model into a weighted finite state transducer, and use the weighted finite state transducer as a first language model, where the trained language model is obtained by training reply information that is in the reference format and the length of the reply information is not less than a reference length; obtain a second language model based on reply information that is in the reference format and the length of the reply information is less than the reference length, and obtain a third language model based on a reference vocabulary; and combine the first language model, the second language model, and the third language model to obtain a total language model, and use the total language model as the dynamic target language model.

Optionally, the first obtaining module 901 includes:
a first obtaining unit, configured to obtain a word confusion network based on reply information that is in the reference format and the length of the reply information is not less than a reference length, where each vocabulary in the word confusion network has a transition probability;

a calculation unit, configured to calculate a penalty weight of each vocabulary, convert the word confusion network into a weighted finite state transducer based on the penalty weight of each vocabulary, and use the weighted finite state transducer as a first language model;

a second obtaining unit, configured to obtain a second language model based on reply information that is in the reference format and the length of the reply information is less than the reference length, and obtain a third language model based on a reference vocabulary; and a combining unit, configured to combine the first language model, the second language model, and the third language model to obtain a total language model, and use the total language model as the dynamic target language model.

Optionally, the calculation unit is configured to use, for any vocabulary, a negative logarithm value of a transition probability of the vocabulary as the penalty weight.

Optionally, the calculation unit is configured to use, for any vocabulary, a logarithm value of a quantity of pieces of reply information that is in the reference format and that includes the vocabulary as the penalty weight.

Optionally, the calculation unit is configured to use, for any vocabulary, a logarithm value of a quantity of times of occurrence of the vocabulary in the reply information in the reference format as the penalty weight.

In conclusion, in this embodiment of this application, the dynamic target language model that includes the front-end part and the core part is obtained or generated based on the reply information of the first intent, the speech signal is parsed to obtain the key word, and then the dynamic target language model is invoked to parse the key word to obtain the second intent and the service content. Because the dynamic target language model is obtained based on the reply information of the first intent, both the second intent and the service content that are obtained through parsing by using the dynamic target language model are related to the first intent. Therefore, in this embodiment of this application, speeches irrelevant to the first intent are ignored, so that provided service content does not deviate from a user requirement, a recognition effect is good, and user experience is improved.

In addition, in this embodiment of this application, the rear-end part in the dynamic target language model is configured to determine whether a speech signal has a plurality of intents, to provide a service indicated by each intent of the user. Therefore, user experience is further improved.

It should be understood that, when the apparatus provided in FIG. 9 implements functions of the apparatus, division into the foregoing functional modules is merely used as an example for description. During actual application, the foregoing functions may be allocated to different functional modules for implementation based on a requirement. In other words, a device is divided into different functional modules in terms of an inner structure, to implement all or some of the functions described above. In addition, the apparatus provided in the foregoing embodiment and the method embodiments pertain to a same concept. For an implementation of the apparatus, refer to the method embodiments. Details are not described herein again.

An embodiment of this application further provides a speech recognition device. The device includes a memory and a processor. The memory stores at least one instruction. The at least one instruction is loaded and executed by the processor, to implement a speech recognition method provided in this embodiment of this application. The method includes: obtaining or generating a dynamic target language model based on reply information of a first intent, where the dynamic target language model includes a front-end part and a core part, the core part is configured to determine a possible description related to the reply information, and the front-end part is configured to determine a description of confirmatory information of the reply information; obtaining a speech signal, and parsing the speech signal to generate a key word; and invoking the dynamic target language model to determine a second intent and service content, where the front-end part of the dynamic target language model parses out the second intent based on the key word, and the core part of the dynamic target language model parses out the service content based on the key word.

Optionally, the dynamic target language model further includes a rear-end part, and the rear-end part is configured to determine whether an additional intent exists. The method further includes: invoking the dynamic target language model to determine an additional intent, and parsing out, by using the rear-end part of the dynamic target language model, the additional intent based on the key word.

Optionally, the rear-end part includes a rear-end indicator word. The invoking the dynamic target language model to determine an additional intent, and parsing out, by using the rear-end part of the dynamic target language model, the additional intent based on the key word includes: parsing out, based on the key word by using the rear-end part, a reference rear-end indicator word and a time point at which the reference rear-end indicator word is located; updating the dynamic target language model based on the reference rear-end indicator word with reference to the first intent and the second intent, to obtain an updated target language model; and invoking the updated target language model, to parse out the additional intent based on the key word and the time point at which the reference rear-end indicator word is located.

Optionally, before the obtaining a speech signal, the method further includes: buffering a historical speech signal; and the parsing the speech signal to generate a key word includes: parsing the speech signal, and performing context detection by using the historical speech signal to generate the key word.

Optionally, after the invoking the dynamic target language model to determine a second intent and service content, the method further includes: confirming the second intent, to obtain a confirmed second intent.

Optionally, the confirming the second intent, to obtain a confirmed second intent includes: sending confirmation information of the second intent to a user, obtaining a second intent fed back by the user, and using the second intent fed back by the user as the confirmed second intent.

Optionally, the obtaining or generating the dynamic target language model based on the reply information of the first intent includes: converting the reply information of the first intent into a reference format to obtain reply information in the reference format, and obtaining or generating the dynamic target language model based on the reply information in the reference format.

Optionally, the obtaining or generating the dynamic target language model based on the reply information in the reference format includes: converting a trained language model into a weighted finite state transducer, and using the weighted finite state transducer as the dynamic target language model, where the trained language model is obtained by training the reply information in the reference format and a reference vocabulary.

Optionally, the obtaining or generating the dynamic target language model based on the reply information in the reference format includes: converting a trained language model into a weighted finite state transducer, and using the weighted finite state transducer as a first language model, where the trained language model is obtained by training reply information that is in the reference format and the length of the reply information is not less than a reference length; obtaining a second language model based on reply information that is in the reference format and the length of the reply information is less than the reference length, and obtaining a third language model based on a reference vocabulary; and combining the first language model, the second language model, and the third language model to obtain a total language model, and using the total language model as the dynamic target language model.

Optionally, the obtaining or generating the dynamic target language model based on the reply information in the reference format includes: obtaining a word confusion network based on reply information that is in the reference format and the length of the reply information is not less than a reference length, where each vocabulary in the word confusion network has a transition probability; calculating a penalty weight of each vocabulary, converting the word confusion network into a weighted finite state transducer based on the penalty weight of each vocabulary, and using the weighted finite state transducer as a first language model; obtaining a second language model based on reply information that is in the reference format and the length of the reply information is less than the reference length, and obtaining a third language model based on a reference vocabulary; and combining the first language model, the second language model, and the third language model to obtain a total language model, and using the total language model as the dynamic target language model.

Optionally, the calculating a penalty weight of each vocabulary includes: using, for any vocabulary, a negative logarithm value of a transition probability of the vocabulary as the penalty weight.

Optionally, the calculating a penalty weight of each vocabulary includes: using, for any vocabulary, a logarithm value of a quantity of pieces of reply information that is in the reference format and that includes the vocabulary as the penalty weight.

Optionally, the calculating a penalty weight of each vocabulary includes: using, for any vocabulary, a logarithm value of a quantity of times of occurrence of the vocabulary in the reply information in the reference format as the penalty weight.

An embodiment of this application further provides a computer-readable storage medium. The storage medium stores at least one instruction. The instruction is loaded and executed by a processor to implement a speech recognition method provided in this embodiment of this application. The method includes: obtaining or generating a dynamic target language model based on reply information of a first intent, where the dynamic target language model includes a front-end part and a core part, the core part is configured to determine a possible description related to the reply information, and the front-end part is configured to determine a description of confirmatory information of the reply information; obtaining a speech signal, and parsing the speech signal to generate a key word; and invoking the dynamic target language model to determine a second intent and service content, where the front-end part of the dynamic target language model parses out the second intent based on the key word, and the core part of the dynamic target language model parses out the service content based on the key word.

Optionally, the dynamic target language model further includes a rear-end part, and the rear-end part is configured to determine whether an additional intent exists. The method further includes: invoking the dynamic target language model to determine an additional intent, and parsing out, by using the rear-end part of the dynamic target language model, the additional intent based on the key word.

Optionally, the rear-end part includes a rear-end indicator word. The invoking the dynamic target language model to determine an additional intent, and parsing out, by using the rear-end part of the dynamic target language model, the additional intent based on the key word includes: parsing out, based on the key word by using the rear-end part, a reference rear-end indicator word and a time point at which the reference rear-end indicator word is located; updating the dynamic target language model based on the reference rear-end indicator word with reference to the first intent and the second intent, to obtain an updated target language model; and invoking the updated target language model, to parse out the additional intent based on the key word and the time point at which the reference rear-end indicator word is located.

Optionally, before the obtaining a speech signal, the method further includes: buffering a historical speech signal; and the parsing the speech signal to generate a key word includes: parsing the speech signal, and performing context detection by using the historical speech signal to generate the key word.

Optionally, after the invoking the dynamic target language model to determine a second intent and service content, the method further includes: confirming the second intent, to obtain a confirmed second intent.

Optionally, the confirming the second intent, to obtain a confirmed second intent includes: sending confirmation information of the second intent to a user, obtaining a second intent fed back by the user, and using the second intent fed back by the user as the confirmed second intent.

Optionally, the obtaining or generating the dynamic target language model based on the reply information of the first intent includes: converting the reply information of the first intent into a reference format to obtain reply information in the reference format, and obtaining or generating the target language model based on the reply information in the reference format.

Optionally, the obtaining or generating the dynamic target language model based on the reply information in the reference format includes: converting a trained language model into a weighted finite state transducer, and using the weighted finite state transducer as the dynamic target language model, where the trained language model is obtained by training the reply information in the reference format and a reference vocabulary.

Optionally, the obtaining or generating the dynamic target language model based on the reply information in the reference format includes: converting a trained language model into a weighted finite state transducer, and using the weighted finite state transducer as a first language model, where the trained language model is obtained by training reply information that is in the reference format and the length of the reply information is not less than a reference length; obtaining a second language model based on reply information that is in the reference format and the length of the reply information is less than the reference length, and obtaining a third language model based on a reference vocabulary; and combining the first language model, the second language model, and the third language model to obtain a total language model, and using the total language model as the dynamic target language model.

Optionally, the obtaining or generating the dynamic target language model based on the reply information in the reference format includes: obtaining a word confusion network based on reply information that is in the reference format and the length of the reply information is not less than a reference length, where each vocabulary in the word confusion network has a transition probability; calculating a penalty weight of each vocabulary, converting the word confusion network into a weighted finite state transducer based on the penalty weight of each vocabulary, and using the weighted finite state transducer as a first language model; obtaining a second language model based on reply information that is in the reference format and the length of the reply information is less than the reference length, and obtaining a third language model based on a reference vocabulary; and combining the first language model, the second language model, and the third language model to obtain a total language model, and using the total language model as the dynamic target language model.

Optionally, the calculating a penalty weight of each vocabulary includes: using, for any vocabulary, a negative logarithm value of a transition probability of the vocabulary as the penalty weight.

Optionally, the calculating a penalty weight of each vocabulary includes: using, for any vocabulary, a logarithm value of a quantity of pieces of reply information that is in the reference format and that includes the vocabulary as the penalty weight.

Optionally, the calculating a penalty weight of each vocabulary includes: using, for any vocabulary, a logarithm value of a quantity of times of occurrence of the vocabulary in the reply information in the reference format as the penalty weight.

An embodiment of this application further provides a chip. The chip includes a processor. The processor is configured to invoke and run instructions stored in a memory, to cause a communications device on which the chip is installed to perform any one of the foregoing speech recognition methods.

An embodiment of this application further provides another chip. The chip includes an input interface, an output interface, a processor, and a memory. The input interface, the output interface, the processor, and the memory are connected to each other through an internal connection path. The processor is configured to execute codes in the memory. When the code is executed, the processor is configured to perform any one of the foregoing speech recognition methods.

Optionally, there are one or more processors, and there are one or more memories.

Optionally, the memory may be integrated with the processor, or the memory and the processor may be separately disposed.

In an implementation, the memory and the processor may be integrated into one chip, or may be disposed in different chips. A type of the memory and a manner in which the memory and the processor are disposed are not limited in this embodiment of this application.

It should be understood that the processor may be a central processing unit (CPU); or may be another general-purpose processor, a digital signal processor (DSP), an application-specific integrated circuit (ASIC), a field programmable gate array (FPGA) or another programmable logic device, a discrete gate or transistor logic device, or a discrete hardware component, or the like. The general-purpose processor may be a microprocessor, any conventional processor, or the like. It should be noted that the processor may be a processor that supports an advanced reduced instruction set computing machine (advanced RISC machines, ARM) architecture.

Further, in an optional embodiment, the foregoing memory may include a read-only memory and a random access memory, and provide instructions and data for the processor. The memory may further include a nonvolatile random access memory. For example, the memory may further store information of a device type.

The memory may be a volatile memory or a nonvolatile memory, or may include a volatile memory and a nonvolatile memory. The nonvolatile memory may be a read-only memory (read-only memory, ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (random access memory, RAM), used as an external cache. For example but not limitation, many forms of RAMs are available. For example, a static random access memory (static RAM, SRAM), a dynamic random access memory (dynamic random access memory, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchlink dynamic random access memory (synchlink DRAM, SLDRAM), and a direct rambus random access memory (direct rambus RAM, DR RAM).

An embodiment of this application provides a computer program. When the computer program is executed by a computer, a processor or the computer may be enabled to perform corresponding steps and/or procedures in the foregoing method embodiments.

All or some of the foregoing embodiments may be implemented by using software, hardware, firmware, or any combination thereof. When software is used to implement the embodiments, the embodiments may be implemented completely or partially in a form of a computer program product. The computer program product includes one or more computer instructions. When the computer program instructions are loaded and executed on the computer, the procedure or functions according to this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state disk (solid state disk)), or the like.

The foregoing descriptions are merely the embodiments of this application, but are not intended to limit this application. Any modification, equivalent replacement, or improvement made without departing from the spirit and principle of this application should fall within the protection scope of this application.

What is claimed is:

1. A speech recognition method, the method comprising:
obtaining a first intent of a user by an in-vehicle module;
obtaining or generating a dynamic target language model based on reply information of the in-vehicle module to the first intent, the dynamic target language model comprising a front-end part and a core part, the core part is configured to determine a possible description related to the reply information and the front-end part is configured to determine a description of confirmatory information of the user in response to the reply information;
obtaining a speech signal comprising a source data for determining the description related to the reply information or the confirmatory information of the user in response to the reply information;
parsing the speech signal based on a historical speech signal of a past time to generate key words related to the first intent; and
invoking the dynamic target language model to determine a second intent and a service content, the front-end part of the dynamic target language model parsing out the second intent based on a first key word of the key words, and the core part of the dynamic target language model parsing out the service content based on a second key word of the key words.

2. The method according to claim 1, wherein the dynamic target language model further comprises a rear-end part, and the rear-end part is configured to determine whether an additional intent exists, the method further comprising:
invoking the dynamic target language model to determine the additional intent; and
parsing out, using the rear-end part of the dynamic target language model, the additional intent based on a third key word.

3. The method according to claim 2, wherein the rear-end part comprises a rear-end indicator word, and the invoking the dynamic target language model to determine the additional intent, and parsing out, by using the rear-end part of the dynamic target language model, the additional intent based on the third key word further comprising:
parsing out, based on the third key word and using the rear-end part, a reference rear-end indicator word and a time point at which the reference rear-end indicator word is located;
updating the dynamic target language model based on the reference rear-end indicator word, with reference to the first intent and the second intent, to obtain an updated target language model; and
invoking the updated target language model to parse out the additional intent based on the key word and the time point.

4. The method according to claim 1, wherein before the obtaining the speech signal, the method further comprising:
buffering the historical speech signal; and
the parsing the speech signal to generate the key words comprising parsing the speech signal and performing context detection using the historical speech signal to generate the key words.

5. The method according to claim 1, wherein the obtaining or generating the dynamic target language model based on the reply information of the first intent comprises:
converting the reply information of the first intent into the reply information in a reference format; and
obtaining or generating the dynamic target language model based on the reply information in the reference format.

6. The method according to claim 5, wherein the obtaining or generating the dynamic target language model based on the reply information in the reference format comprises:
converting a trained language model into a weighted finite state transducer, and using the weighted finite state transducer as the dynamic target language model, wherein the trained language model is obtained by training the reply information in the reference format and a reference vocabulary.

7. The method according to claim 5, wherein the obtaining or generating the dynamic target language model based on the reply information in the reference format comprises:
converting a trained language model into a weighted finite state transducer and using the weighted finite state transducer as a first language model, wherein the trained language model is obtained by training reply information in the reference format and a reply information length of the reply information is not less than a reference length;
obtaining a second language model based on reply information in the reference format and the reply information length is less than the reference length;
obtaining a third language model based on a reference vocabulary; and
combining the first language model, the second language model, and the third language model to obtain a total language model, and using the total language model as the dynamic target language model.

8. The method according to claim 5, wherein the obtaining or generating the dynamic target language model based on the reply information in the reference format comprises:
obtaining a word confusion network based on the reply information in the reference format and a reply information length of the reply information is not less than a reference length, wherein each vocabulary in the word confusion network has a transition probability;
calculating a penalty weight of each vocabulary, converting the word confusion network into a weighted finite state transducer based on the penalty weight of each vocabulary, and using the weighted finite state transducer as a first language model;
obtaining a second language model based on the reply information in the reference format and the reply information length is less than the reference length;
obtaining a third language model based on a reference vocabulary; and
combining the first language model, the second language model, and the third language model to obtain a total language model, and using the total language model as the dynamic target language model.

9. The method according to claim 8, wherein the calculating the penalty weight of the each vocabulary comprises:
using, for any vocabulary, a negative logarithm value of a transition probability of the vocabulary as the penalty weight.

10. The method according to claim 8, wherein the calculating the penalty weight of the each vocabulary comprises:
using, for any vocabulary, a logarithm value of a quantity of pieces of reply information t in the reference format and that comprises the vocabulary as the penalty weight.

11. The method according to claim 8, wherein the calculating the penalty weight of the each vocabulary comprises:
using, for any vocabulary, a logarithm value of a quantity of times of occurrence of the vocabulary in the reply information in the reference format as the penalty weight.

12. A speech recognition device, the speech recognition device comprising:
a non-transitory memory storing instructions; and
at least one processor in communication with the memory, the at least one processor configured, upon execution of the instructions, to perform the following steps:
obtaining a first intent of a user by an in-vehicle module;
obtaining or generating a dynamic target language model based on reply information of the in-vehicle module to the first intent, the dynamic target language model comprising a front-end part and a core part, the core part is configured to determine a possible description related to the reply information and the front-end part is configured to determine a description of confirmatory information of the user in response to the reply information;
obtaining a speech signal comprising a source data for determining the description related to the reply information or the confirmatory information of the user in response to the reply information;
parsing the speech signal based on a historical speech signal of a past time to generate key words related to the first intent; and
invoking the dynamic target language model to determine a second intent and a service content, the front-end part of the dynamic target language model parsing out the second intent based on a first key word of the key words, and the core part of the dynamic target language model parsing out the service content based on a second key word of the key words.

13. The speech recognition device according to claim 12, wherein the dynamic target language model further comprises a rear-end part, and the rear-end part is configured to determine whether an additional intent exists, the at least one processor further executing the instructions to perform the steps of:
invoking the dynamic target language model to determine the additional intent; and
parsing out, using the rear-end part of the dynamic target language model, the additional intent based on a third key word.

14. The speech recognition device according to claim 13, wherein the rear-end part comprises a rear-end indicator word, and the invoking the dynamic target language model comprises:
parsing out, based on the third key word and using the rear-end part, a reference rear-end indicator word and a time point at which the reference rear-end indicator word is located;
updating the dynamic target language model based on the reference rear-end indicator word, with reference to the first intent and the second intent, to obtain an updated target language model; and invoking the updated target language model to parse out the additional intent based on the key word and the time point at which the reference rear-end indicator word is located.

15. The speech recognition device according to claim 12, wherein before the obtaining the speech signal, the at least one processor further executing the instructions to perform the steps of:

buffering a historical speech signal; and the parsing the speech signal to generate the key words comprising parsing the speech signal and performing context detection using the historical speech signal to generate the key word.

16. The speech recognition device according to claim 12, wherein the obtaining or generating the dynamic target language model based on the reply information of the first intent comprises:

converting the reply information of the first intent into the reply information in the reference format; and obtaining or generating the dynamic target language model based on the reply information in the reference format.

17. The speech recognition device according to claim 16, wherein the obtaining or generating the dynamic target language model based on the reply information in the reference format comprises:

converting a trained language model into a weighted finite state transducer, and using the weighted finite state transducer as the dynamic target language model, wherein the trained language model is obtained by training the reply information in the reference format and a reference vocabulary.

18. The speech recognition device according to claim 16, wherein the obtaining or generating the dynamic target language model based on the reply information in the reference format comprises:

converting a trained language model into a weighted finite state transducer, and using the weighted finite state transducer as a first language model, wherein the trained language model is obtained by training reply information in the reference format and a reply information length of the reply information is not less than a reference length;

obtaining a second language model based on reply information in the reference format and the reply information length is less than the reference length;

obtaining a third language model based on a reference vocabulary; and combining the first language model, the second language model, and the third language model to obtain a total language model, and using the total language model as the dynamic target language model.

19. The speech recognition device according to claim 16, wherein the obtaining or generating the dynamic target language model based on the reply information in the reference format comprises:

obtaining a word confusion network based on the reply information in the reference format and a reply information length of the reply information is not less than a reference length, wherein each vocabulary in the word confusion network has a transition probability;

calculating a penalty weight of each vocabulary, converting the word confusion network into a weighted finite state transducer based on the penalty weight of each vocabulary, and using the weighted finite state transducer as a first language model;

obtaining a second language model based on the reply information in the reference format and the reply information length is less than the reference length;

obtaining a third language model based on a reference vocabulary; and combining the first language model, the second language model, and the third language model to obtain a total language model, and using the total language model as the dynamic target language model.

20. A non-transitory computer-readable media storing computer instructions, that when executed by one or more processors, cause the one or more processors to perform the steps of:

obtaining a first intent of a user by an in-vehicle module;

obtaining or generating a dynamic target language model based on reply information of the in-vehicle module to the first intent, the dynamic target language model comprising a front-end part and a core part, the core part is configured to determine a possible description related to the reply information, and the front-end part is configured to determine a description of confirmatory information of the user in response to the reply information;

obtaining a speech signal comprising a source data for determining the description related to the reply information or the confirmatory information of the user in response to the reply information;

parsing the speech signal based on a historical speech signal of a past time to generate key words related to the first intent; and invoking the dynamic target language model to determine a second intent and a service content, the front-end part of the dynamic target language model parsing out the second intent based on a first key word of the key words, and the core part of the dynamic target language model parsing out the service content based on a second key word of the key words.

* * * * *